(12) United States Patent (10) Patent No.: US 12,389,389 B2
MolavianJazi et al. (45) Date of Patent: Aug. 12, 2025

(54) SCHEDULING VIA MULTIPLE PHYSICAL DOWNLINK CONTROL CHANNELS

(71) Applicant: Samsung Electronics Co., Ltd., Suwon-si (KR)

(72) Inventors: Ebrahim MolavianJazi, San Jose, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 520 days.

(21) Appl. No.: 17/806,062

(22) Filed: Jun. 8, 2022

(65) Prior Publication Data

US 2022/0408458 A1 Dec. 22, 2022

Related U.S. Application Data

(60) Provisional application No. 63/212,807, filed on Jun. 21, 2021.

(51) Int. Cl.
*H04W 72/12* (2023.01)
*H04W 24/08* (2009.01)
(Continued)

(52) U.S. Cl.
CPC ....... *H04W 72/1263* (2013.01); *H04W 24/08* (2013.01); *H04W 72/0446* (2013.01); *H04W 72/0453* (2013.01); *H04W 72/23* (2023.01)

(58) Field of Classification Search
CPC ......... H04W 72/1263; H04W 72/1289; H04W 72/0446; H04W 24/08; H04W 52/365;
(Continued)

(56) References Cited

U.S. PATENT DOCUMENTS

2020/0137731 A1 4/2020 Wei et al.
2020/0396760 A1 12/2020 Yi et al.
(Continued)

FOREIGN PATENT DOCUMENTS

EP 3641184 A1 4/2020
EP 3580982 B1 6/2021

OTHER PUBLICATIONS

"5G; NR; Physical channels and modulation (3GPP TS 38.211 version 16.5.0, Release 16)", ETSI TS 138 211 V16.5.0, Apr. 2021, 138 pgs.
(Continued)

*Primary Examiner* — Wei Zhao

(57) ABSTRACT

Methods and apparatuses for scheduling via multiple physical downlink control channels (PDCCHs). A method for a user equipment (UE) includes receiving a first PDCCH that provides a first downlink control information (DCI) format and a second PDCCH that provides a second DCI format. The method further includes determining: first parameters for reception of a physical downlink shared channel (PDSCH), or for transmission of a physical uplink shared channel (PUSCH), based on values of fields of the first DCI format; and second parameters for reception of the PDSCH, or for transmission of the PUSCH, based on values of fields of the second DCI format. The second parameters are different than the first parameters. The method further includes receiving the PDSCH, or transmitting the PUSCH, based on the first parameters and the second parameters.

20 Claims, 7 Drawing Sheets

(51) Int. Cl.
*H04W 72/0446* (2023.01)
*H04W 72/0453* (2023.01)
*H04W 72/1263* (2023.01)
*H04W 72/23* (2023.01)

(58) Field of Classification Search
CPC . H04W 52/10; H04W 52/36; H04W 72/0453; H04W 72/044; H04W 72/045
See application file for complete search history.

(56) References Cited

U.S. PATENT DOCUMENTS

| | | | |
|---|---|---|---|
| 2021/0029726 A1 | 1/2021 | Papasakellariou | |
| 2021/0045105 A1* | 2/2021 | Yoon | H04L 1/1864 |
| 2022/0070899 A1* | 3/2022 | Huang | H04L 5/0007 |
| 2022/0225247 A1* | 7/2022 | Huang | H04W 52/34 |

OTHER PUBLICATIONS

"5G; NR; Multiplexing and channel coding (3GPP TS 38.212 version 16.5.0 Release 16)", ETSI TS 138 212 V16.5.0, Apr. 2021, 155 pages.

"5G; NR; Physical layer procedures for control (3GPP TS 38.213 version 16.5.0 Release 16)", ETSI TS 138 213 V16.5.0, Apr. 2021, 188 pages.

"5G; NR; Physical layer procedures for data (3GPP TS 38.214 version 16.5.0 Release 16)", ETSI TS 138 214 V16.5.0, Apr. 2021, 173 pages.

"5G; NR; Medium Access Control (MAC) protocol specification (3GPP TS 38.321 version 16.4.0 Release 16)", ETSI TS 138 321 V16.4.0, Apr. 2021, 159 pages.

"5G; NR; Radio Resource Control (RRC); Protocol specification (3GPP TS 38.331 version 16.4.1 Release 16)", ETSI TS 138 331 V16.4.1, Apr. 2021, 932 pages.

"5G; NR; NR and NG-RAN Overall description; Stage-2 (3GPP TS 38.300 version 16.5.0 Release 16)", ETSI TS 138 300 V16.5.0, Apr. 2021, 153 pages.

International Search Report and Written Opinion issued Sep. 20, 2022 regarding International Application No. PCT/KR2022/008694, 7 pages.

Interdigital, Inc., "On the support of single DCI scheduling multi-cell", 3GPP TSG RAN WG1 #105-e, R1-2105402, May 2021, 2 pages.

Zte, "Discussion on multi-cell PDSCH scheduling via a single DCI", 3GPP TSG RAN WG1 #105-e, R1-2104341, May 2021, 20 pages.

Extended European Search Report issued Sep. 18, 2024 regarding Application No. 22828690.2, 10 pages.

Ericsson, "Rel. 18 MIMO work item proposals", 3GPP TSG-RAN WG1 Meeting #104bis-e, R1-2103668, Apr. 2021, 9 pages.

* cited by examiner

SCHEDULING VIA MULTIPLE PHYSICAL DOWNLINK CONTROL CHANNELS

CROSS-REFERENCE TO RELATED APPLICATION AND CLAIM OF PRIORITY

This application claims priority under 35 U.S.C. § 119(e) to U.S. Provisional Patent Application No. 63/212,807 filed on Jun. 21, 2021. The above-identified provisional patent application is hereby incorporated by reference in its entirety.

TECHNICAL FIELD

The present disclosure relates generally to wireless communication systems and, more specifically, the present disclosure relates to scheduling via multiple physical downlink control channels (PDCCHs).

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to scheduling via multiple PDCCHs.

In one embodiment, a method is provided. The method includes receiving a first PDCCH that provides a first downlink control information (DCI) format and a second PDCCH that provides a second DCI format. The method further includes determining: first parameters for reception of a physical downlink shared channel (PDSCH), or for transmission of a physical uplink shared channel (PUSCH), based on values of fields of the first DCI format; and second parameters for reception of the PDSCH, or for transmission of the PUSCH, based on values of fields of the second DCI format. The second parameters are different than the first parameters. The method further includes receiving the PDSCH, or transmitting the PUSCH, based on the first parameters and the second parameters.

In another embodiment, a user equipment (UE) is provided. The UE includes a transceiver configured to receive a first PDCCH that provides a first DCI format and a second PDCCH that provides a second DCI format. The UE further includes a processor operably coupled to the transceiver. The processor is configured to determine: first parameters for reception of a PDSCH, or for transmission of a PUSCH, based on values of fields of the first DCI format; and second parameters for reception of the PDSCH, or for transmission of the PUSCH, based on values of fields of the second DCI format, wherein the second parameters are different than the first parameters. The transceiver is further configured to receive the PDSCH, or transmit the PUSCH, based on the first parameters and the second parameters.

In yet another embodiment, a base station is provided. The base station includes a transceiver configured to transmit a first PDCCH that provides a first DCI format and a second PDCCH that provides a second DCI format. The base station further includes a processor operably coupled to the transceiver. The processor is configured to determine: first parameters for transmission of a PDSCH, or for reception of a PUSCH, based on values of fields of the first DCI format; and second parameters for transmission of the PDSCH, or for reception of the PUSCH, based on values of fields of the second DCI format, wherein the second parameters are different than the first parameters. The transceiver is further configured to transmit the PDSCH, or receive the PUSCH, based on the first parameters and the second parameters.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
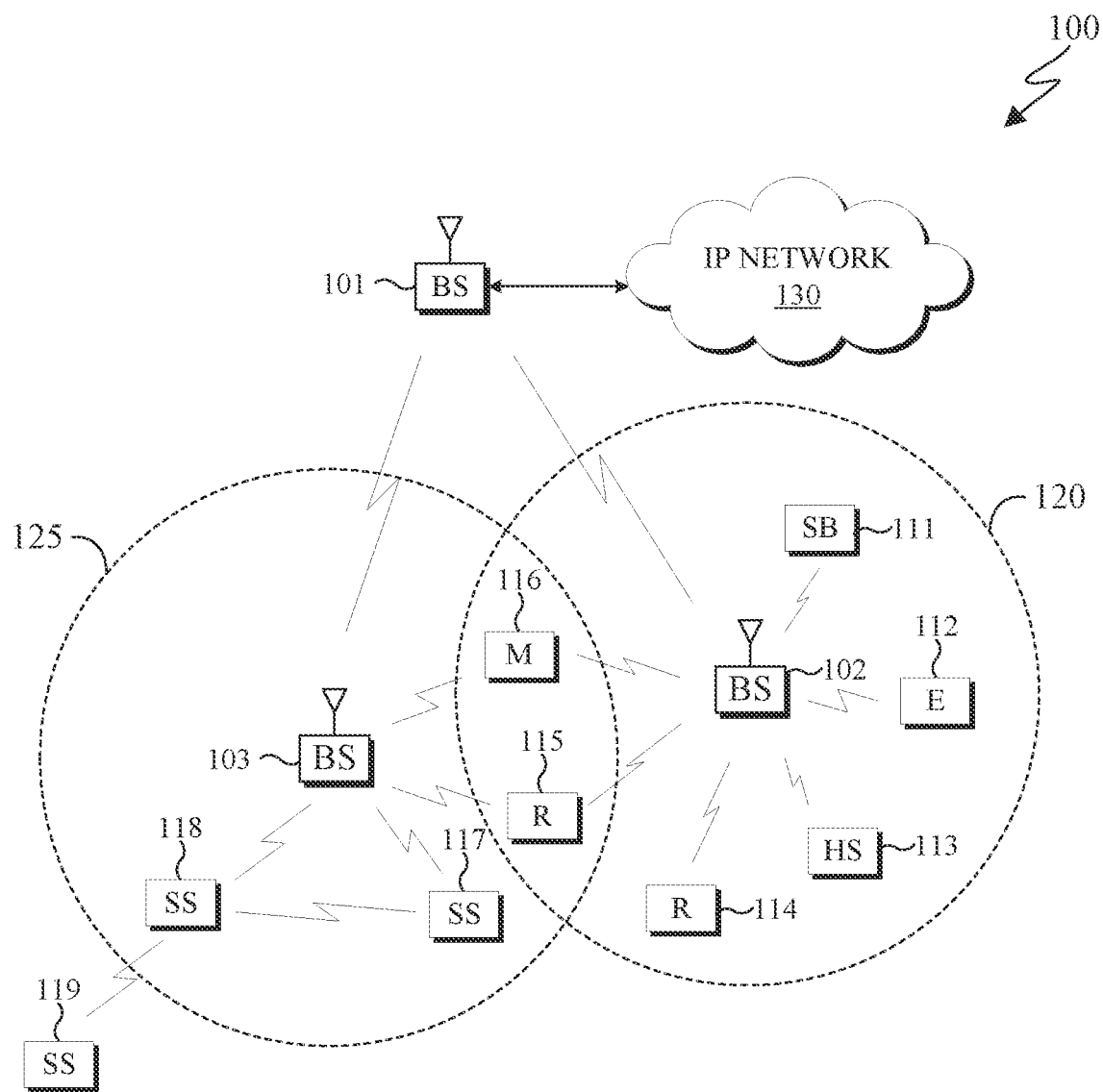
FIG. 1 illustrates an example wireless network according to embodiments of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 Rel-16 v16.5.0, "NR; Physical channels and modulation" (REF1); 3GPP TS 38.212 Rel-16 v16.5.0, "NR; Multiplexing and channel coding" (REF2); 3GPP TS 38.213 Rel-16 v16.5.0, "NR; Physical layer procedures for control" (REF3); 3GPP TS 38.214 Rel-16 v16.5.0, "NR; Physical layer procedures for data" (REF4); 3GPP TS 38.321 Rel-16 v16.4.0, "NR; Medium Access Control (MAC) protocol specification" (REF5); 3GPP TS 38.331 Rel-16 v16.4.1, "NR; Radio Resource Control (RRC) protocol specification" (REF6); and 3GPP TS 38.300 Rel-16 v16.5.0, "NR; NR and NG-RAN Overall Description; Stage 2" (REF7).

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long-term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like. For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine). The UE may also be a car, a truck, a van, a drone, or any similar machine or a device in such machines.

Figure 2:
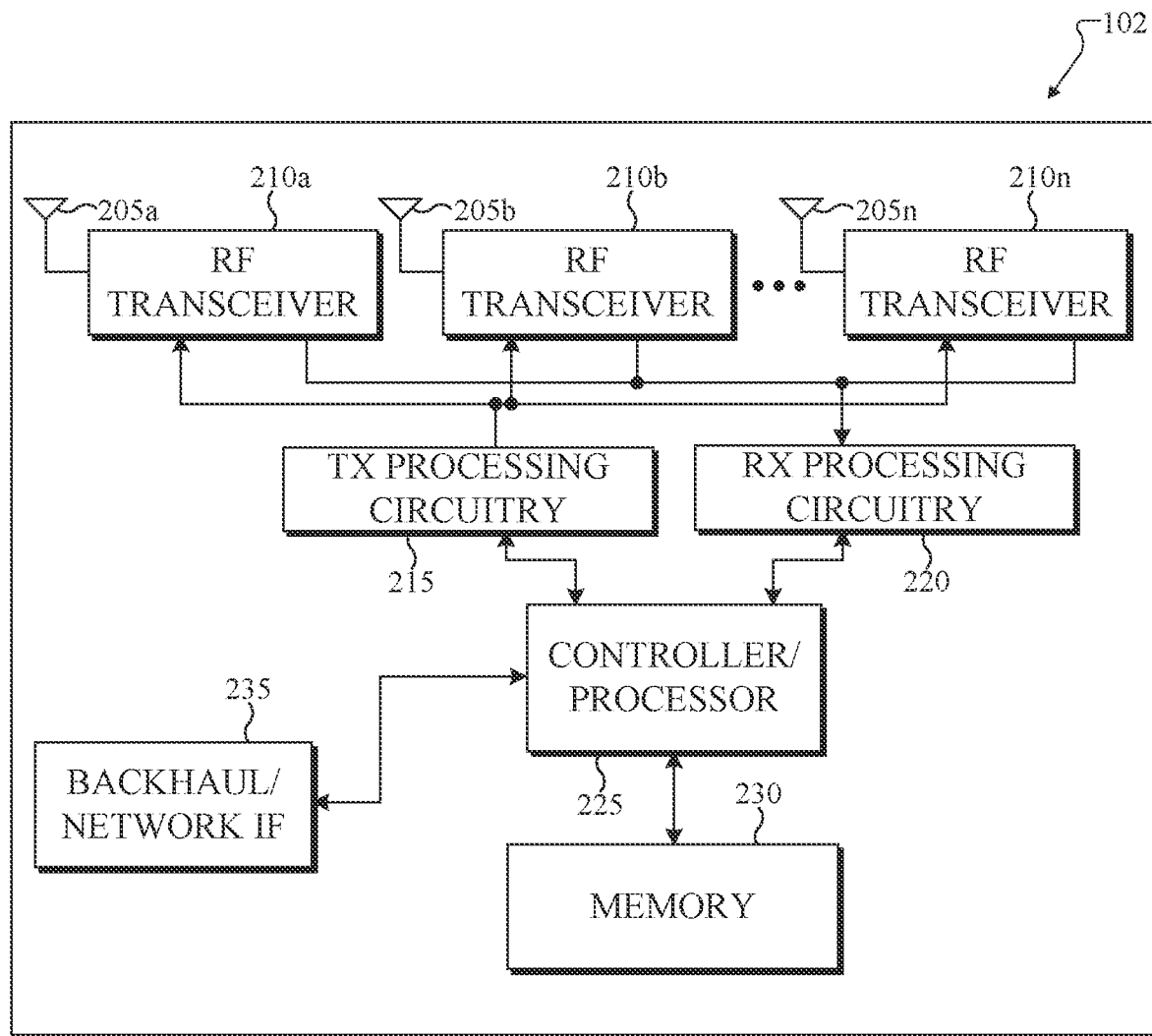
FIG. 2 illustrates an example base station (BS) according to embodiments of the present disclosure.
Figure 3:
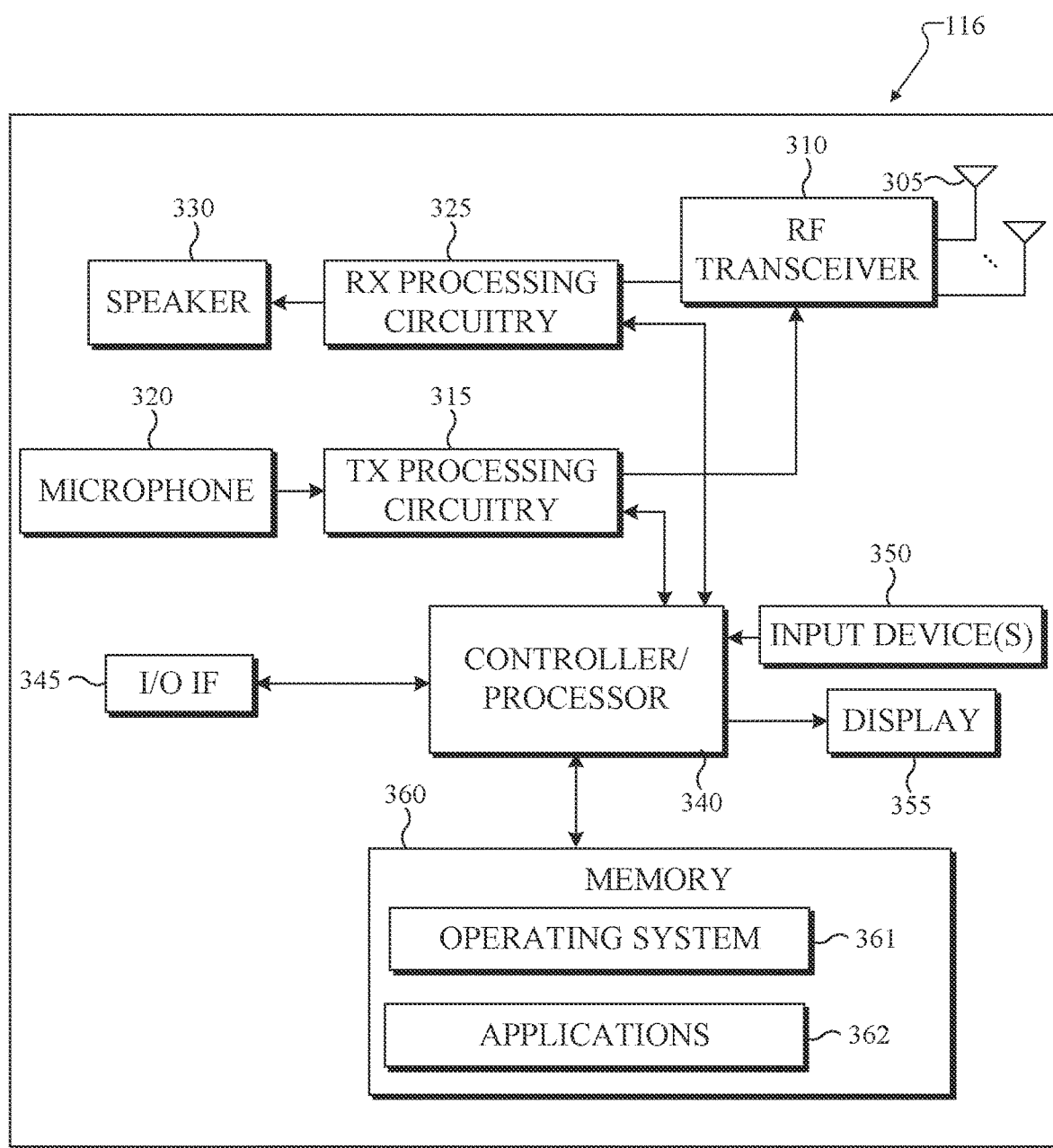
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes various gNodeB (bNG) such a base station, BS 101, a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115, the UE 116, the UE 117, and the UE 118. In some embodiments, one or more of the BSs 101-103 may communicate with each other and with the UEs 111-118 using 5G/NR, long term evolution (LTE), long term evolution-advanced (LTE-A), WiMAX, WiFi, or other wireless communication techniques.

In certain embodiments, multiple UEs (such as the UE 117, the UE 118, and the UE 119) may communicate directly with each other through device-2-device communication. In some embodiments, a UE, such as UE 119, is outside the coverage area of the network, but can communicate with other UEs inside the coverage area of the network, such as UE 118, or outside the coverage area of the network.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-119 include circuitry, circuitry, programing, or a combination thereof for scheduling via multiple PDCCHs. In certain embodiments, and one or more of the BSs 101-103 includes circuitry, programing, or a combination thereof for scheduling via multiple PDCCHs.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support scheduling via multiple PDCCHs. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

As described in more detail below, the transmit and receive paths of the BS 102 (implemented using the RF transceivers 210a-210n, TX processing circuitry 275, and/or RX processing circuitry 270) support communication with aggregation of frequency division duplex (FDD) cells and time division duplex (TDD) cells.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 and 117-119 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
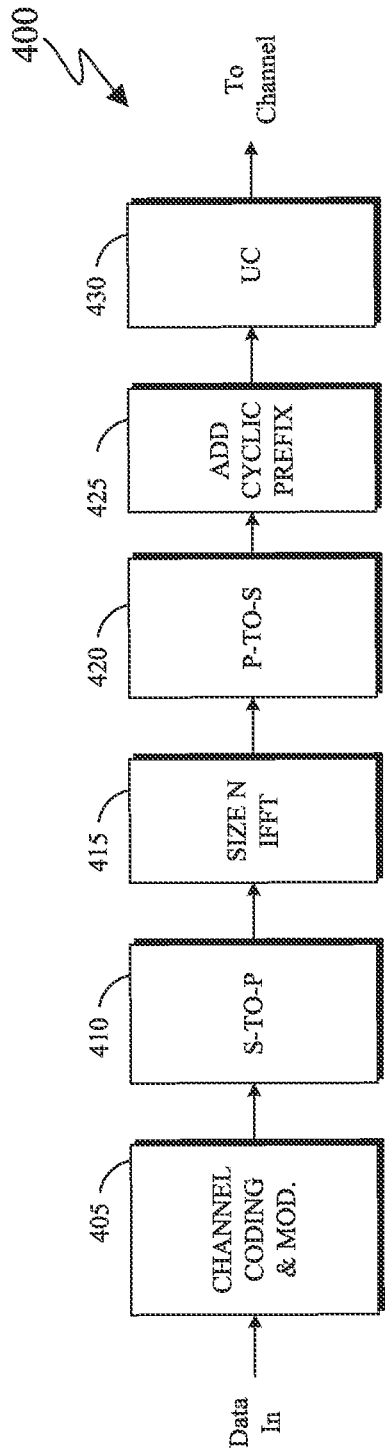
FIGS. 4 and 5 illustrate example wireless transmit and receive paths according to embodiments of the present disclosure.
Figure 5:
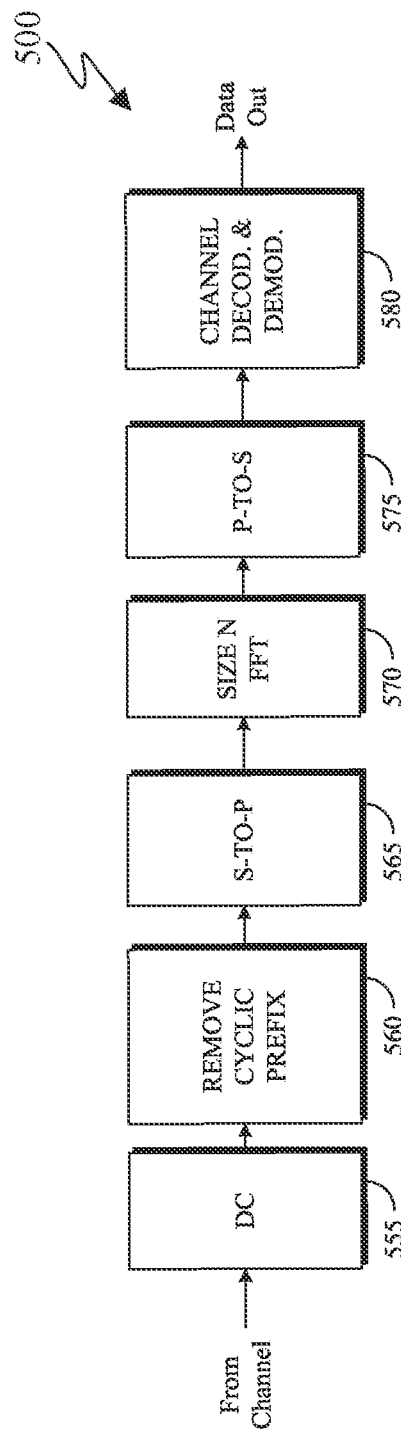

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support scheduling via multiple PDCCHs as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-118. Similarly, each of UEs 111-118 may implement the transmit path 400 for transmitting in the uplink to the BSs 101-103 and may implement the receive path 500 for receiving in the downlink from the BSs 101-103.

Furthermore, each of UEs 111-119 may implement a transmit path 400 for transmitting in the sidelink to another one of UEs 111-119 and may implement a receive path 500 for receiving in the sidelink from another one of UEs 111-119.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Embodiments of the present disclosure relates to a pre-5th-Generation (5G) or 5G or beyond 5G communication system to be provided for supporting one or more of: higher data rates, lower latency, higher reliability, improved coverage, and massive connectivity, and so on. Various embodiments apply to UEs operating with other radio access technologies (RATs) and/or standards, such as different releases/generations of 3GPP standards (including beyond 5G, 5G Advanced, 6G, and so on), IEEE standards (such as 802.16 WiMAX and 802.11 Wi-Fi and so on), and so forth.

Embodiments of the present disclosure considers enhancements for cross-carrier scheduling operation in a carrier aggregation (CA) framework to support joint scheduling of multiple cells.

Embodiments of the present disclosure take into consideration that in legacy 5G NR systems, a downlink or uplink data transmission can be scheduled only for a single serving cell. In other words, a downlink control (DCI) format provides scheduling information parameters for a PDSCH or a physical uplink shared channel (PUSCH) on a single serving cell. If the serving cell is a scheduled cell, the UE receives a DCI format for the PDSCH/PUSCH in a PDCCH that the UE receives on a corresponding scheduling cell. Based on a carrier indication field (CIF) in the DCI format, the UE can determine a serving cell on which the UE can receive the PDSCH or transmit the PUSCH.

However, legacy NR system does not support joint scheduling of multiple PDSCHs or multiple PUSCH on multiple cells using a single/common control signaling, such as by using a single DCI format. For such operation, the UE receives multiple DCI formats, wherein each DCI format can schedule one of the multiple PDSCHs or PUSCHs. Such operation achieves the intended outcome, but with possibly high signaling overhead. In various scenarios, it is possible that several scheduling parameters or corresponding UE operations are shared/common among the multiple PDSCHs or PUSCHs on the jointly scheduled cells, referred to as co-scheduled cells.

For example, the UE may use a same physical uplink control channel (PUCCH) resource to transmit hybrid automatic repeat request (HARQ)-acknowledgement (ACK) feedback corresponding to the multiple PDSCHs. Therefore, an indication for the same PUCCH resource (and corresponding operations for PUCCH transmission) may be unnecessarily repeated multiple times. In addition, in some scenarios, such as intra-band CA, it is likely that physical channel conditions are correlated, so various scheduling parameters pertaining link adaptation, MIMO/beamforming operation, and even possibly resource allocation can be common and repeated among the co-scheduled cells. Such unnecessary overhead in control signaling can be significant, especially when the number of co-scheduled cells are large, such as 4-8 cells. Last but not least, cyclic redundancy check (CRC) field needs to be repeated multiple times, which incurs significant signaling overhead, especially for large number of co-scheduled cells.

Therefore, embodiments of the present disclosure take into consideration that there is a need for multi-cell scheduling, wherein multiple cells can be jointly scheduled using reduced signaling overhead, such as by using only a single DCI format.

Embodiments of the present disclosure also take into consideration that there is a need to achieve multi-cell scheduling using a reasonable DCI format size, possibly same as a legacy DCI format size or slightly larger, while at the same time, the scheduling flexibility is reasonably maintained compared to a scenario with multiple separate DCI formats for each cell.

Embodiments of the present disclosure further take into consideration that there is a need take into account a number of co-scheduled cells and a relative similarity of channel/radio conditions among the co-scheduled cells, when designing a method for multi-cell scheduling.

Accordingly, the present disclosure provides methods and apparatus for multi-cell scheduling with reduced signaling overhead.

Embodiments of the present disclosure describe mechanisms for multi-cell scheduling. For example, a UE (such as the UE 116) can receive a first DCI format in a first PDCCH that provides cell-common scheduling parameters for a set of co-scheduled cells and receives a second DCI format in a second PDCCH that provides cell-specific scheduling parameters for the set of co-scheduled cells. The disclosure includes methods for the UE to determine an association between the first and the second PDCCHs/DCI formats based on a link of parameters of the DCI formats, such as DCI format sizes or radio network temporary identifier (RNTIs) used for scrambling a CRC of the DCI format. The disclosure also provides mechanisms for the UE to determine such association based on a link of PDCCH monitoring parameters, such as a CORESET, or a search space set, or control channel elements (CCEs), or PDCCH monitoring occasions where the UE monitors/receives the first and the second linked Embodiments of the disclosure for supporting multi-cell scheduling with reduced signaling overhead are summarized in the following and are fully elaborated further below. Combinations of the embodiments are also applicable, but they are not described in detail for brevity.

For example, various embodiments described in greater detail below describe a multi-cell scheduling operation. For instance, a UE (such as the UE 116) can be provided one or more sets of co-scheduled cells by higher layers. The term set of co-scheduled cells is used to refer to a set of serving cells wherein the UE can be scheduled PDSCH receptions or PUSCH transmissions on two or more cells from the set of co-scheduled cells by a single DCI format, or by using complementary methods such as those described herein. Additionally, the UE can be indicated via a DCI format in a PDCCH or a MAC CE in a PDSCH a subset of a set of co-scheduled cells, wherein cells of the subset can change across different PDCCH monitoring occasions, for example, as indicated by a corresponding DCI format.

For another example, various embodiments described in greater detail below describe multi-stage PDCCHs/DCIs for multi-cell scheduling. For instance, a UE (such as the UE 116) can be provided information for multi-cell scheduling of multiple PDSCHs/PDCCHs on multiple respective cells using a multi-stage DCI method, such as a 2-stage DCI. In this case a first-stage DCI format includes a set of cell-common fields, and a second-stage DCI format includes cell-specific fields. The UE receives the first-stage DCI format in a first PDCCH and the second-stage DCI format in a second PDCCH. This approach can be beneficial, for example, for co-scheduling several cells that have several common physical characteristics, such as a time-domain resource allocation or a frequency-domain resource allocation, without incurring latency and without having a DCI format size that is too large (that would result if the first-stage and second-stage DCI formats were combined into a single DCI format) for receiving cell-specific parameters when the second PDCCH is received in a same slot as the first PDCCH.

For another example, various embodiments described in greater detail below describe associating multi-stage PDCCHs/DCIs based on DCI format parameters. For instance, a UE (such as the UE 116) can determine an association among a number of linked multi-stage PDCCHs/DCIs, such as two PDCCHs/DCIs, that provide multi-cell scheduling information based on parameters of the linked DCI formats, such as size(s) of the DCI format(s), or RNTI(s) associated with the DCI format(s), or by an explicit indication in some field(s) in the DCI format(s). Such association enables the UE to identify the linked DCI formats, among other DCI formats that the UE receives, such as single-cell-scheduling DCI formats.

For yet another example, various embodiments described in greater detail below describe associating multi-stage PDCCHs/DCIs based on PDCCH monitoring parameters. For instance, a UE (such as the UE 116) can determine an association among a number of linked multi-stage PDCCHs/DCIs, such as two PDCCHs/DCIs, that provide multi-cell scheduling information based on PDCCH monitoring parameters, such as CORESET, search space, CCEs, or monitoring occasions in which the UE receives the first and the second linked PDCCHs. Such association enables the UE to identify the linked PDCCHs, among other PDCCHs that the UE receives, such as those corresponding to single-cell scheduling.

As used here, the term "configuration" or "higher layer configuration" and variations thereof (such as "configured" and so on) are used to refer to one or more of: a system information signaling such as by a Master Information Block (MIB) or a system information block (SIB) (such as SIB1), a common or cell-specific higher layer/RRC signaling, or a dedicated or UE-specific or bandwidth part (BWP)-specific higher layer/RRC signaling.

Additionally, as used herein, the term signal quality is used to refer to reference signal received power (RSRP) or reference signal received quality (RSRQ) or received signal strength indicator (RSSI) or signal to noise ratio (SNR) or signal to interference and noise ratio (SINR), with or without filtering such as L1 or L3 filtering, of a channel or a signal such as a reference signal (RS) including synchronized signal (SS) physical broadcast channel (PBCH) (also denoted as SS/PBCH block or SSB), channel state information reference signal (CSI-RS), or sounding reference signal (SRS).

An antenna port is defined such that the channel over which a symbol on the antenna port is conveyed can be inferred from the channel over which another symbol on the same antenna port is conveyed.

For a demodulation reference signal (DM-RS) associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same precoding resource block group (PRG).

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a PBCH, the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE may assume that SS/PBCH blocks transmitted with the same block index on the same center frequency location are quasi co-located with respect to Doppler spread, Doppler shift, average gain, average delay, delay spread, and, when applicable, spatial Rx parameters. The UE shall not assume quasi co-location for any other SS/PBCH block transmissions.

In absence of CSI-RS configuration, and unless otherwise configured, the UE may assume PDSCH DM-RS and SS/PBCH block to be quasi co-located with respect to Doppler shift, Doppler spread, average delay, delay spread, and, when applicable, spatial Rx parameters. The UE may assume that the PDSCH DM-RS within the same code division multiplexing (CDM) group are quasi co-located with respect to Doppler shift, Doppler spread, average delay, delay spread, and spatial Rx. The UE may also assume that DM-RS ports associated with a PDSCH are quasi co-location (QCL) with QCL Type A, Type D (when applicable) and average gain. The UE may further assume that no DM-RS collides with the SS/PBCH block.

A UE (such as the UE 116) can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each transmission configuration indication (TCI)-State contains parameters for configuring a QCL relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first downlink (DL) RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info.

For example, a quasi co-location type of 'QCL-TypeA' can correspond to {Doppler shift, Doppler spread, average delay, delay spread}. For another example, a quasi co-location type of 'QCL-TypeB' can correspond to {Doppler shift, Doppler spread}. For another example, a quasi co-location type of 'QCL-TypeC' can correspond to {Doppler shift, average delay}. For yet another example, a quasi co-location type of 'QCL-TypeD' can correspond to 'QCL-TypeD': {Spatial Rx parameter}.

In certain embodiments, a UE (such as the UE 116) receives a MAC-CE activation command to map up to N, e.g., N=8 TCI states to the codepoints of the DCI field 'Transmission Configuration Indication'. When the HARQ-ACK information corresponding to the PDSCH carrying the (MAC-CE) activation command is transmitted in slot n, the indicated mapping between TCI states and codepoints of the DCI field 'Transmission Configuration Indication' should be applied after a MAC-CE application time, e.g., starting from the first slot that is after slot $n+3N_{slot}^{subframe,\mu}$ where $N_{slot}^{subframe,\mu}$ is a number of slot per subframe for subcarrier spacing (SCS) configuration μ.

Independent of the configuration of tci-PresentInDCI and tci-PresentDCI-1-2 in RRC connected mode, if the offset between the reception of the DL DCI and the corresponding PDSCH is less than the threshold timeDurationForQCL and at least one configured TCI state for the serving cell of scheduled PDSCH contains qcl-Type set to 'typeD', then the UE may assume that the DM-RS ports of PDSCH(s) of a serving cell are quasi co-located with the RS(s) with respect to the QCL parameter(s) used for PDCCH quasi co-location indication of the CORESET associated with a monitored search space with the lowest controlResourceSetId in the latest slot in which one or more CORESETs within the active BWP of the serving cell are monitored by the UE. In this case, if the qcl-Type is set to 'typeD' of the PDSCH DM-RS is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers).

It is noted that if a UE is configured with enableDefault-TCIStatePerCoresetPoolIndex and the UE is configured by higher layer parameter PDCCH-Config that contains two different values of coresetPoolIndex in different ControlResourceSets, then the UE may assume that the DM-RS ports of PDSCH associated with a value of coresetPoolIndex of a serving cell are quasi co-located with the RS(s) with respect to the QCL parameter(s) used for PDCCH quasi co-location indication of the CORESET associated with a monitored search space with the lowest controlResourceSetId among CORESETs, which are configured with the same value of coresetPoolIndex as the PDCCH scheduling that PDSCH, in the latest slot in which one or more CORESETs associated with the same value of coresetPoolIndex as the PDCCH scheduling that PDSCH within the active BWP of the serving cell are monitored by the UE. In this case, if the 'QCL-TypeD' of the PDSCH DM-RS is different from that of the PDCCH DM-RS with which they overlap in at least one symbol and they are associated with same coresetPoolIndex, the UE is expected to prioritize the reception of PDCCH associated with that CORESET. This also applies to the intra-band CA case (when PDSCH and the CORESET are in different component carriers).

It is also noted that if a UE is configured with enable TwoDefaultTCI-States, and at least one TCI codepoint indicates two TCI states, the UE may assume that the DM-RS ports of PDSCH or PDSCH transmission occasions of a serving cell are quasi co-located with the RS(s) with respect to the QCL parameter(s) associated with the TCI states corresponding to the lowest codepoint among the TCI codepoints containing two different TCI states. When the UE is configured by higher layer parameter repetitionScheme set to 'tdmSchemeA' or is configured with higher layer parameter repetitionNumber, and the offset between the reception of the DL DCI and the first PDSCH transmission occasion is less than the threshold timeDurationForQCL, the mapping of the TCI states to PDSCH transmission occasions is determined according to clause 5.1.2.1 by replacing the indicated TCI states with the TCI states corresponding to the lowest codepoint among the TCI codepoints containing two different TCI states based on the activated TCI states in the slot with the first PDSCH transmission occasion. In this case, if the 'QCL-TypeD' in both of the TCI states corresponding to the lowest codepoint among the TCI codepoints containing two different TCI states is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers).

In that above cases above, if none of configured TCI states for the serving cell of scheduled PDSCH is configured with qcl-Type set to 'typeD', the UE shall obtain the other QCL assumptions from the indicated TCI states for its scheduled PDSCH irrespective of the time offset between the reception of the DL DCI and the corresponding PDSCH.

If the PDCCH carrying the scheduling DCI is received on one component carrier, and the PDSCH scheduled by that DCI is on another component carrier: then the timeDurationForQCL is determined based on the subcarrier spacing of the scheduled PDSCH. If $\mu_{PDCCH} < \mu_{PDSCH}$ an additional timing delay $$d \frac{2^{\mu_{PDSCH}}}{2^{\mu_{PDCCH}}}$$

is added to the timeDurationForQCL, where d is defined in 5.2.1.5.1a-1, otherwise d is zero. For both the cases, when the UE is configured with enableDefaultBeamForCCS, and when the offset between the reception of the DL DCI and the corresponding PDSCH is less than the threshold timeDurationForQCL, and when the DL DCI does not have the TCI field present, the UE obtains its QCL assumption for the scheduled PDSCH from the activated TCI state with the lowest ID applicable to PDSCH in the active BWP of the scheduled cell.

For PUSCH scheduled by DCI format 0_0 on a cell and if the higher layer parameter enableDefaultBeamPL-ForPUSCH0-0 is set 'enabled', the UE is not configured with PUCCH resources on the active uplink (UL) BWP and the UE is in RRC connected mode, the UE shall transmit PUSCH according to the spatial relation, if applicable, with a reference to the RS configured with qcl-Type set to 'typeD' corresponding to the QCL assumption of the CORESET with the lowest ID on the active DL BWP of the cell.

For PUSCH scheduled by DCI format 0_0 on a cell and if the higher layer parameter enableDefaultBeamPL-ForPUSCH0 is set 'enabled', the UE is configured with PUCCH resources on the active UL BWP where all the PUCCH resource(s) are not configured with any spatial relation and the UE is in RRC connected mode, the UE shall transmit PUSCH according to the spatial relation, if applicable, with a reference to the RS configured with qcl-Type set to 'typeD' corresponding to the QCL assumption of the control resource set (CORESET) with the lowest ID on the active DL BWP of the cell in case CORESET(s) are configured on the cell.

In CA, two or more Component Carriers (CCs) are aggregated. A UE (such as the UE 116) may simultaneously receive or transmit on one or multiple CCs depending on its capabilities. For example, a UE with single timing advance capability for CA can simultaneously receive and/or transmit on multiple CCs corresponding to multiple serving cells sharing the same timing advance (multiple serving cells grouped in one Timing advance group (TAG)). For another example, a UE with multiple timing advance capability for CA can simultaneously receive and/or transmit on multiple CCs corresponding to multiple serving cells with different timing advances (multiple serving cells grouped in multiple TAGs). Next generation radio access network (NG-RAN) ensures that each TAG contains at least one serving cell. For yet another example, a non-CA capable UE can receive on a single CC and transmit on a single CC corresponding to one serving cell only (one serving cell in one TAG).

CA is supported for both contiguous and non-contiguous CCs. When CA is deployed frame timing and system frame number (SFN) are aligned across cells that can be aggregated, or an offset in multiples of slots between the primary cell (PCell)/primary secondary cell (PSCell) and a secondary cells (SCells) is configured to the UE. The maximum number of configured CCs for a UE is 16 for DL and 16 for UL.

When CA is configured, the UE only has one RRC connection with the network. At RRC connection establishment/re-establishment/handover, one serving cell provides the non-access stratum (NAS) mobility information, and at RRC connection re-establishment/handover, one serving cell provides the security input. This cell is referred to as the PCell. Depending on UE capabilities, SCells can be configured to form together with the PCell a set of serving cells. The configured set of serving cells for a UE therefore always consists of one PCell and one or more SCells.

The reconfiguration, addition, and removal of SCells can be performed by RRC. At intra-NR handover and during connection resume from RRC_INACTIVE, the network can also add, remove, keep, or reconfigure SCells for usage with the target PCell. When adding a new SCell, dedicated RRC signalling is used for sending all required system information of the SCell i.e., while in connected mode, UEs need not acquire broadcast system information directly from the SCells.

To enable reasonable UE battery consumption when CA is configured, an activation/deactivation mechanism of Cells is supported. When an SCell is deactivated, the UE does not need to receive the corresponding PDCCH or PDSCH, cannot transmit in the corresponding uplink, nor is it required to perform channel quality indicator (CQI) measurements. Conversely, when an SCell is active, the UE shall receive PDSCH and PDCCH (if the UE is configured to monitor PDCCH from this SCell) and is expected to be able to perform CQI measurements. NG-RAN ensures that while PUCCH SCell (a Secondary Cell configured with PUCCH)

is deactivated, SCells of secondary PUCCH group (a group of SCells whose PUCCH signalling is associated with the PUCCH on the PUCCH SCell) should not be activated. NG-RAN ensures that SCells mapped to PUCCH SCell are deactivated before the PUCCH SCell is changed or removed.

When reconfiguring the set of serving cells SCells added to the set are initially activated or deactivated and SCells which remain in the set (either unchanged or reconfigured) do not change their activation status (activated or deactivated).

At handover or connection resume from RRC_INACTIVE, SCells are activated or deactivated.

To enable reasonable UE battery consumption when bandwidth adaptation (BA) is configured, only one UL BWP for each uplink carrier and one DL BWP or only one DL/UL BWP pair can be active at a time in an active serving cell, all other BWPs that the UE is configured with being deactivated. On deactivated BWPs, the UE does not monitor the PDCCH, does not transmit on PUCCH, physical random-access channel (PRACH) and Uplink shared channel (UL-SCH).

To enable fast SCell activation when CA is configured, one dormant BWP can be configured for an SCell. If the active BWP of the activated SCell is a dormant BWP, the UE stops monitoring PDCCH and transmitting SRS/PUSCH/PUCCH on the SCell but continues performing CSI measurements, Automatic gain control (AGC) and beam management, if configured. A DCI is used to control entering/leaving the dormant BWP for one or more SCell(s) or one or more SCell group(s).

The dormant BWP is one of the UE's dedicated BWPs configured by network via dedicated RRC signalling. The SpCell and PUCCH SCell cannot be configured with a dormant BWP.

Cross-carrier scheduling with the CIF allows the PDCCH of a serving cell to schedule resources on another serving cell but with the following restrictions: (i) cross-carrier scheduling does not apply to PCell i.e. PCell is always scheduled via its PDCCH; (ii) when an SCell is configured with a PDCCH, that cell's PDSCH and PUSCH are always scheduled by the PDCCH on this SCell; (iii) when an SCell is not configured with a PDCCH, that SCell's PDSCH and PUSCH are always scheduled by a PDCCH on another serving cell; and (iv) the scheduling PDCCH and the scheduled PDSCH/PUSCH can use the same or different numerologies.

Some of the restrictions above may be relaxed. For example, dynamic spectrum sharing (DSS) allows LTE and NR to share the same carrier. As the number of NR devices in a network increase, it is important that sufficient scheduling capacity for NR UEs on the shared carriers is ensured. In the case of DSS operation, PDCCH enhancements for cross-carrier scheduling including can be considered such that PDCCH of an SCell, referred to as a special/scheduling SCell (sSCell), can schedule PDSCH or PUSCH on the P(S)Cell.

The PDCCH can be used to schedule DL transmissions on PDSCH and UL transmissions on PUSCH. Here the DCI on PDCCH includes downlink assignments containing at least modulation and coding format, resource allocation, and hybrid-ARQ information related to DL-SCH. The DCI on PDCCH also includes uplink scheduling grants containing at least modulation and coding format, resource allocation, and hybrid-ARQ information related to UL-SCH.

In addition to scheduling, PDCCH can be used for (i) activation and deactivation of configured PUSCH transmission with configured grant; (ii) activation and deactivation of PDSCH semi-persistent transmission; (iii) notifying one or more UEs of the slot format; (iv) notifying one or more UEs of the physical resource block(s) (PRB(s)) and OFDM symbol(s) where the UE may assume no transmission is intended for the UE; (v) transmission of transmit power control (TPC) commands for PUCCH and PUSCH; (vi) transmission of one or more TPC commands for SRS transmissions by one or more UEs; (vii) switching a UE's active bandwidth part; (viii) initiating a random access procedure; (ix) indicating the UE(s) to monitor the PDCCH during the next occurrence of the discontinuous reception (DRX) on-duration; and (x) in Integrated access and backhaul (IAB) context, indicating the availability for soft symbols of an IAB-DU.

A UE (such as the UE 116) monitors a set of PDCCH candidates in the configured monitoring occasions in one or more configured CORESETs according to the corresponding search space configurations.

A CORESET consists of a set of PRBs with a time duration of 1 to 3 OFDM symbols. The resource units Resource Element Groups (REGs) and Control Channel Elements (CCEs) are defined within a CORESET with each CCE consisting of a set of REGs. Control channels are formed by aggregation of CCE. Different code rates for the control channels are realized by aggregating different number of CCE. Interleaved and non-interleaved CCE-to-REG mapping are supported in a CORESET.

Polar coding is used for PDCCH. Each resource element group carrying PDCCH carries its own DM-RS. QPSK modulation is used for PDCCH.

A UE (such as the UE 116) monitors a set of PDCCH candidates in one or more CORESETs on the active DL BWP on each activated serving cell configured with PDCCH monitoring according to corresponding search space sets where monitoring implies decoding each PDCCH candidate according to the monitored DCI formats.

If a UE is provided monitoringCapabilityConfig for a serving cell, the UE obtains an indication to monitor PDCCH on the serving cell for a maximum number of PDCCH candidates and non-overlapping CCEs (i) per slot if monitoringCapabilityConfig=r15monitoringcapability, or (ii) per span if monitoringCapabilityConfig=r16monitoringcapability.

If the UE is not provided monitoringCapabilityConfig, the UE monitors PDCCH on the serving cell for a maximum number of PDCCH candidates and non-overlapping CCEs per slot.

A UE (such as the UE 116) can indicate a capability to monitor PDCCH according to one or more of the combinations (X, Y)=(2, 2), (4, 3), and (7, 3) per SCS configuration of $\mu=0$ and $\mu=1$. A span is a number of consecutive symbols in a slot where the UE is configured to monitor PDCCH. Each PDCCH monitoring occasion is within one span. If a UE monitors PDCCH on a cell according to combination (X, Y), the UE supports PDCCH monitoring occasions in any symbol of a slot with minimum time separation of X symbols between the first symbol of two consecutive spans, including across slots. A span starts at a first symbol where a PDCCH monitoring occasion starts and ends at a last symbol where a PDCCH monitoring occasion ends, where the number of symbols of the span is up to Y.

If a UE can support (i) a first set of $N_{cells,0}^{DL}$ serving cells where the UE is either not provided coresetPoolIndex or is provided coresetPoolIndex with a single value for all CORESETs on all DL BWPs of each scheduling cell from the first set of serving cells, and (ii) a second set of $N_{cells,1}^{DL}$ serving cells where the UE is not provided coresetPoolIndex or is provided coresetPoolIndex with a value 0 for a first CORESET, and with a value 1 for a second CORESET on any DL BWP of each scheduling cell from the second set of serving cells, then the UE determines, for the purpose of reporting pdcch-BlindDetectionCA, a number of serving cells as $N_{cells,0}^{DL}+R \cdot N_{cells,1}^{DL}$ where R is a value reported by the UE.

If a UE (such as the UE 116) indicates in UE-NR-Capability a carrier aggregation capability larger than 4 serving cells and the UE is not provided monitoringCapabilityConfig for any downlink cell or if the UE is provided monitoringCapabilityConfig=r15monitoringcapability for all downlink cells where the UE monitors PDCCH, the UE includes in UE-NR-Capability an indication for a maximum number of PDCCH candidates and for a maximum number of non-overlapped CCEs the UE can monitor per slot when the UE is configured for carrier aggregation operation over more than 4 cells. When a UE is not configured for NR-DC operation, the UE determines a capability to monitor a maximum number of PDCCH candidates and a maximum number of non-overlapped CCEs per slot that corresponds to $N_{cells}^{cap}$ downlink cells, where $N_{cells}^{cap}$ is $N_{cells,0}^{DL}+R \cdot N_{cells,1}^{DL}$ if the UE does not provide pdcch-BlindDetectionCA where $N_{cells,0}^{DL}+N_{cells,1}^{DL}$ is the number of configured downlink serving cells; otherwise, $N_{cells}^{cap}$ is the value of pdcch-BlindDetectionCA.

When a UE (such as the UE 116) is configured for NR-DC operation, the UE determines a capability to monitor a maximum number of PDCCH candidates and a maximum number of non-overlapped CCEs per slot that corresponds to $N_{cells}^{cap}=N_{cells}^{MCG}$ downlink cells for the master cell group (MCG) where $N_{cells}^{MCG}$ is provided by pdcch-BlindDetection for the MCG and determines a capability to monitor a maximum number of PDCCH candidates and a maximum number of non-overlapped CCEs per slot that corresponds to $N_{cells}^{cap}=N_{cells}^{SCG}$ downlink cells for the secondary cell group (SCG) where $N_{cells}^{SCG}$ is provided by pdcch-BlindDetection for the SCG. When the UE is configured for carrier aggregation operation over more than 4 cells, or for a cell group when the UE is configured for NR-DC operation, the UE does not expect to monitor per slot a number of PDCCH candidates or a number of non-overlapped CCEs that is larger than the maximum number as derived from the corresponding value of $N_{cells}^{cap}$.

If a UE (such as the UE 116) indicates in UE-NR-Capability-r16 a carrier aggregation capability larger than two downlink cells, the UE includes in UE-NR-Capability-r16 an indication for a maximum number of PDCCH candidates and a maximum number of non-overlapped CCEs that the UE can monitor per span when the UE is configured for carrier aggregation operation over more than two downlink cells with monitoringCapabilityConfig=r16monitoringcapability.

When a UE (such as the UE 116) is not configured for NR-DC operation and the UE is provided monitoringCapabilityConfig=r16monitoringcapability for all downlink cell where the UE monitors PDCCH, the UE determines a capability to monitor a maximum number of PDCCH candidates and a maximum number of non-overlapped CCEs per span that corresponds to $N_{cells}^{cap-r16}$ downlink cells, where $N_{cells}^{cap-r16}$ is the number of configured downlink cells if the UE does not provide pdcch-MonitoringCA; otherwise, $N_{cells}^{cap-r16}$ is the value of pdcch-MonitoringCA.

When the UE is configured for carrier aggregation operation over more than 2 cells, or for a cell group when the UE is configured for NR-DC operation, the UE does not expect to monitor per span a number of PDCCH candidates or a number of non-overlapped CCEs that is larger than the maximum number as derived from the corresponding value of $N_{cells}^{cap-r16}$.

If a UE (such as the UE 116) indicates in UE-NR-Capability a carrier aggregation capability larger than one downlink cell with monitoringCapabilityConfig=r15monitoringcapability or larger than one downlink cell with monitoringCapabilityConfig=r16monitoringcapability, the UE includes in UE-NR-Capability-r16 an indication for a maximum number of PDCCH candidates and a maximum number of non-overlapped CCEs the UE can monitor for downlink cells with monitoringCapabilityConfig=r15monitoringcapability or for downlink cells with monitoringCapabilityConfig=r16monitoringcapability when the UE is configured for carrier aggregation operation over more than two downlink cells with at least one downlink cell with monitoringCapabilityConfig=r15monitoringcapability and at least one downlink cell with monitoringCapabilityConfig=r16monitoringcapability.

When a UE is not configured for NR-DC operation, the UE determines a capability to monitor a maximum number of PDCCH candidates and a maximum number of non-overlapped CCEs per slot or per span that corresponds to $N_{cells,r15}^{cap-r16}$ downlink cells or to $N_{cells,r16}^{cap-r16}$ downlink cells, respectively. Here, $N_{cells,r15}^{cap-r16}$ is the number of configured downlink cells if the UE does not provide pdcch-BlindDetectionCA1; otherwise, if the UE reports only one combination of (pdcch-BlindDetectionCA1, pdcch-BlindDetectionCA2), $N_{cells,r15}^{cap-r16}$ is the value of pdcch-BlindDetectionCA1; else, $N_{cells,r15}^{cap-r16}$ is the value of pdcch-BlindDetectionCA1 from a combination of (pdcch-BlindDetectionCA1, pdcch-BlindDetectionCA2) that is provided by pdcch-BlindDetectionCA-CombIndicator. Additionally, $N_{cells,r16}^{cap-r16}$ is the number of configured downlink cells if the UE does not provide pdcch-BlindDetectionCA2; otherwise, if the UE reports only one combination of (pdcch-BlindDetectionCA1, pdcch-BlindDetectionCA2), $N_{cells,r16}^{cap-r16}$ is the value of pdcch-BlindDetectionCA2, else, $N_{cells,r16}^{cap-r16}$ is the value of pdcch-BlindDetectionCA2 from a combination of (pdcch-BlindDetectionCA1, pdcch-BlindDetectionCA2) that is provided by pdcch-BlindDetectionCA-CombIndicator.

A set of PDCCH candidates for a UE to monitor is defined in terms of PDCCH search space sets. A search space set can be a common search space (CSS) set or a UE specific search space (USS) set. A UE monitors PDCCH candidates in one or more of the following search spaces sets. For example, a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a system information (SI)-radio network temporary identifier (RNTI) on the primary cell of the MCG. For another example, a Type0A-PDCCH CSS set configured by searchSpaceOtherSystemInformation in PDCCH-ConfigCommon for a DCI format with CRC scrambled by a system information-RNTI (SI-RNTI) on the primary cell of the MCG. For another example, a Type1-PDCCH CSS set configured by ra-SearchSpace in PDCCH-ConfigCommon for a DCI format with CRC scrambled by a random access-RNTI (RA-RNTI), a MsgB-RNTI, or a temporary cell-RNTI (TC-RNTI) on the primary cell. For another example, a Type2-PDCCH CSS set configured by pagingSearchSpace in PDCCH-ConfigCommon for a DCI format with CRC scrambled by a paging-RNTI (P-RNTI) on the primary cell of the MCG. For another example, a Type3-PDCCH CSS set configured by SearchSpace in PDCCH-Config with searchSpaceType=common for DCI formats with CRC scrambled by INT-RNTI, slot format indication—RNTI (SFI-RNTI), TPC-PUSCH-RNTI, TPC-PUCCH-RNTI, TPC-SRS-RNTI, or cancelation indication-RNTI (CI-RNTI) and, only for the primary cell, cell-RNTI (C-RNTI), modulation and coding scheme cell (MCS-C-RNTI), configured scheduling RNTI (CS-RNTI(s)), or power savings (PS-RNTI). For yet another example, a USS set configured by SearchSpace in PDCCH-Config with searchSpaceType=ue-Specific for DCI formats with CRC scrambled by C-RNTI, MCS-C-RNTI, SP-CSI-RNTI, CS-RNTI(s), sidelink-RNTI (SL-RNTI), SL-CS-RNTI, or SL Semi-Persistent Scheduling V-RNTI.

If a UE (such as the UE 116) is provided (i) one or more search space sets by corresponding one or more of searchSpaceZero, searchSpaceSIB1, searchSpaceOtherSystemInformation, pagingSearchSpace, ra-SearchSpace, or a CSS set by PDCCH-Config, and (ii) a SI-RNTI, a P-RNTI, a RA-RNTI, a MsgB-RNTI, a SFI-RNTI, an INT-RNTI, a TPC-PUSCH-RNTI, a TPC-PUCCH-RNTI, or a TPC-SRS-RNTI, then for a RNTI from any of these RNTIs, the UE does not expect to process information from more than one DCI format with CRC scrambled with the RNTI per slot.

For each DL BWP configured to a UE in a serving cell, the UE can be provided by higher layer signalling with P≤3 CORESETs if coresetPoolIndex is not provided, or if a value of coresetPoolIndex is same for all CORESETs if coresetPoolIndex is provided. Similarly, for each DL BWP configured to a UE in a serving cell, the UE can be provided by higher layer signalling with P≤5 CORESETs if coresetPoolIndex is not provided for a first CORESET or is provided and has a value 0 for a first CORESET and is provided and has a value 1 for a second CORESET.

For each CORESET, the UE is provided the following by ControlResourceSet. The UE can be provided, by ControlResourceSet, a CORESET index p, by controlResourceSetId or by controlResourceSetId-v1610, Here. 0<p<12 if coresetPoolIndex is not provided, or if a value of coresetPoolIndex is same for all CORESETs if coresetPoolIndex is provided. Additionally, 0<p<16 if coresetPoolIndex is not provided for a first CORESET or is provided and has a value 0 for a first CORESET and is provided and has a value 1 for a second CORESET. The UE can be provided, by ControlResourceSet, a DM-RS scrambling sequence initialization value by pdcch-DMRS-ScramblingID. The UE can be provided, by ControlResourceSet, a precoder granularity for a number of REGs in the frequency domain where the UE can assume use of a same DM-RS precoder by precoderGranularity. The UE can be provided, by ControlResourceSet, a number of consecutive symbols provided by duration. The UE can be provided, by ControlResourceSet, a set of resource blocks provided by frequencyDomainResources. The UE can be provided, by ControlResourceSet, CCE-to-REG mapping parameters provided by cce-REG-Mapping-Type. The UE can be provided, by ControlResourceSet, an antenna port quasi co-location, from a set of antenna port quasi co-locations provided by TCI-State, indicating quasi co-location information of the DM-RS antenna port for PDCCH reception in a respective CORESET. Here, if the UE is provided by simultaneousTCI-UpdateList1 or simultaneousTCI-UpdateList2 up to two lists of cells for simultaneous TCI state activation, the UE applies the antenna port quasi co-location provided by TCI-States with same activated tci-StateID value to CORESETs with index p in all configured DL BWPs of all configured cells in a list determined from a serving cell index provided by a MAC CE command. The UE can be provided, by ControlResourceSet, an indication for a presence or absence of a transmission configuration indication (TCI) field for a DCI format, other than DCI format 1_0, that schedules PDSCH receptions or indicates SPS PDSCH release or indicates SCell dormancy or indicates a request for a Type-3 HARQ-ACK codebook report without scheduling PDSCH and is transmitted by a PDCCH in CORESET p, by tci-PresentInDCI or tci-PresentDCI-1-2.

When precoderGranularity=allContiguousRBs, a UE does not expect (i) to be configured a set of resource blocks of a CORESET that includes more than four sub-sets of resource blocks that are not contiguous in frequency and (ii) any RE of a CORESET to overlap with any RE determined from lte-CRS-ToMatchAround, or from LTE-CRS-Pattern-List, or with any RE of a SS/PBCH block.

For each CORESET in a DL BWP of a serving cell, a respective frequencyDomainResources provides a bitmap if a CORESET is not associated with any search space set configured with freqMonitorLocations, the bits of the bitmap have a one-to-one mapping with non-overlapping groups of 6 consecutive PRBs, in ascending order of the PRB index in the DL BWP bandwidth of $N_{RB}^{BWP}$ PRBs with starting common RB position $N_{BWP}^{start}$, where the first common RB of the first group of 6 PRBs has common RB index $6 \cdot \lfloor N_{BWP}^{start}/6 \rfloor$ if rb-Offset is not provided, or the first common RB of the first group of 6 PRBs has common RB index $N_{BWP}^{start} + N_{RB}^{offset}$ where $N_{RB}^{offset}$ is provided by rb-Offset. Similarly, for each CORESET in a DL BWP of a serving cell, a respective frequencyDomainResources provides a bitmap if a CORESET is associated with at least one search space set configured with freqMonitorLocations, the first $N_{RBG,set0}^{size}$ bits of the bitmap have a one-to-one mapping with non-overlapping groups of 6 consecutive PRBs, in ascending order of the PRB index in each RB set k in the DL BWP bandwidth of $N_{RB}^{BWP}$ PRBs with starting common RB position $RB_{s0+k,DL}^{start,\mu}$, see REF 4, where the first common RB of the first group of 6 PRBs has common RB index $RB_{s0+k,DL}^{start,\mu} + N_{RB}^{offset}$ and k is indicated by freqMonitorLocations if provided for a search space set; otherwise, k=0. $N_{RBG,set0}^{size} = \lfloor (N_{RB,set0}^{size} - N_{RB}^{offset})/6 \rfloor$, $N_{RB,set0}^{size}$ is a number of available PRBs in the RB set 0 for the DL BWP, and $N_{RB}^{offset}$ is provided by rb-Offset or $N_{RB}^{offset}=0$ of rb-Offset is not provided. If a UE is provided RB sets in the DL BWP, the UE expects that the RBs of the CORESET are within the union of the PRBs in the RB sets of the DL BWP.

For a CORESET other than a CORESET with index 0, if a UE has not been provided a configuration of TCI state(s) by tci-StatesPDCCH-ToAddList and tci-StatesPDCCH-ToReleaseList for the CORESET, or has been provided initial configuration of more than one TCI states for the CORESET by tci-StatesPDCCH-ToAddList and tci-StatesPDCCH-ToReleaseList but has not received a MAC CE activation command for one of the TCI states as described in REF 5, the UE assumes that the DM-RS antenna port associated with PDCCH receptions is quasi co-located with the SS/PBCH block the UE identified during the initial access procedure. Additionally, for a CORESET other than a CORESET with index 0, if a UE has been provided a configuration of more than one TCI states by tci-StatesPDCCH-ToAddList and tci-StatesPDCCH-ToReleaseList for the CORESET as part of Reconfiguration with sync procedure as described in REF6 but has not received a MAC CE activation command for one of the TCI states as described in REF 5, the UE assumes that the DM-RS antenna port associated with PDCCH receptions is quasi co-located with the SS/PBCH block or the CSI-RS resource the UE identified during the random access procedure initiated by the Reconfiguration with sync procedure as described in REF6.

For a CORESET with index 0, the UE assumes that a DM-RS antenna port for PDCCH receptions in the CORESET is quasi co-located with one or more DL RS configured by a TCI state, where the TCI state is indicated by a MAC CE activation command for the CORESET, if any, or a SS/PBCH block the UE identified during a most recent random access procedure not initiated by a PDCCH order that triggers a contention-free random access procedure, if no MAC CE activation command indicating a TCI state for the CORESET is received after the most recent random access procedure.

For a CORESET other than a CORESET with index 0, if a UE (such as the UE 116) is provided a single TCI state for a CORESET, or if the UE receives a MAC CE activation command for one of the provided TCI states for a CORESET, the UE assumes that the DM-RS antenna port associated with PDCCH receptions in the CORESET is quasi co-located with the one or more DL RS configured by the TCI state. For a CORESET with index 0, the UE expects that a CSI-RS configured with qcl-Type set to 'typeD' in a TCI state indicated by a MAC CE activation command for the CORESET is provided by a SS/PBCH block if the UE receives a MAC CE activation command for one of the TCI states, the UE applies the activation command in the first slot that is after slot $k+3N_{slot}^{subframe,\mu}$ where k is the slot where the UE would transmit a PUCCH with HARQ-ACK information for the PDSCH providing the activation command and μ is the SCS configuration for the PUCCH. The active BWP is defined as the active BWP in the slot when the activation command is applied.

For each DL BWP configured to a UE in a serving cell, the UE is provided by higher layers with S≤10. Search space sets where, for each search space set from the S search space sets, the UE is provided the following by SearchSpace. For example, the UE is provided a search space set index s, 0<s<40, by searchSpaceId. For another example, the UE is provided an association between the search space set s and a CORESET p by controlResourceSetId or by controlResourceSetId-v1610. For another example, the UE is provided a PDCCH monitoring periodicity of $k_s$ slots and a PDCCH monitoring offset of $o_s$ slots, by monitoringSlotPeriodicityAndOffset. For another example, the UE is provided a PDCCH monitoring pattern within a slot, indicating first symbol(s) of the CORESET within a slot for PDCCH monitoring, by monitoringSymbolsWithinSlot. For another example, the UE is provided a duration of $T_s<k_s$ slots indicating a number of slots that the search space set s exists by duration. For another example, the UE is provided a number of PDCCH candidates $M_s^{(L)}$ per CCE aggregation level L by aggregationLevel1, aggregationLevel2, aggregationLevel4, aggregationLevel8, and aggregationLevel16, for CCE aggregation level 1, CCE aggregation level 2, CCE aggregation level 4, CCE aggregation level 8, and CCE aggregation level 16, respectively. For yet another example, the UE is provided an indication that search space set s is either a CSS set, or a USS set by searchSpaceType.

For another example, if search space set s is a CSS set, the UE is provided an indication by dci-Format0-0-AndFormat1-0 to monitor PDCCH candidates for DCI format 0_0 and DCI format 1_0. For another example, if search space set s is a CSS set, the UE is provided an indication by dci-Format2-0 to monitor one or two PDCCH candidates, or to monitor one PDCCH candidate per RB set if the UE is provided freqMonitorLocations for the search space set, for DCI format 2_0 and a corresponding CCE aggregation level. For another example, if search space set s is a CSS set, the UE is provided an indication by dci-Format2-1 to monitor PDCCH candidates for DCI format 2_1. For another example, if search space set s is a CSS set, the UE is provided an indication by dci-Format2-2 to monitor PDCCH candidates for DCI format 2_2. For another example, if search space set s is a CSS set, the UE is provided an indication by dci-Format2-3 to monitor PDCCH candidates for DCI format 2_3. For another example, if search space set s is a CSS set, the UE is provided an indication by dci-Format2-4 to monitor PDCCH candidates for DCI format 2_4. For yet another example, if search space set s is a CSS set, the UE is provided an indication by dci-Format2-6 to monitor PDCCH candidates for DCI format 2_6.

For another example, if search space set s is a USS set, the UE is provided an indication by dci-Formats to monitor PDCCH candidates either for DCI format 0_0 and DCI format 1_0, or for DCI format 0_1 and DCI format 1_1, or an indication by dci-FormatsExt to monitor PDCCH candidates for DCI format 0_2 and DCI format 1_2, or for DCI format 0_1, DCI format 1_1, DCI format 0_2, and DCI format 1_2, or for DCI format 3_0, or for DCI format 3_1, or for DCI format 3_0 and DCI format 3_1.

For yet another example, a bitmap by freqMonitorLocations, if provided, to indicate an index of one or more RB sets for the search space set s, where the most significant bit (MSB) k in the bitmap corresponds to RB set k−1 in the DL BWP. For RB set k indicated in the bitmap, the first PRB of the frequency domain monitoring location confined within the RB set is given by $RB_{s0+k,DL}^{start,\mu}+N_{RB}^{offset}$, where $RB_{s0+k,DL}^{start,\mu}$ is the index of first common RB of the RB set k as described in REF 4, and $N_{RB}^{offset}$ is provided by rb-Offset or $N_{RB}^{offset}=0$ if rb-Offset is not provided. For each RB set with a corresponding value of 1 in the bitmap, a frequency domain resource allocation pattern for the monitoring location is determined based on the first $N_{RBG,set\ 0}^{size}$ bits in frequencyDomainResources provided by the associated CORESET configuration.

If the monitoringSymbolsWithinSlot indicates to a UE to monitor PDCCH in a subset of up to three consecutive symbols that are same in every slot where the UE monitors PDCCH for all search space sets, the UE does not expect to be configured with a PDCCH SCS other than 15 kHz if the subset includes at least one symbol after the third symbol.

In certain embodiments, a UE (such as the UE 116) does not expect to be provided a first symbol and a number of consecutive symbols for a CORESET that results to a PDCCH candidate mapping to symbols of different slots.

In certain embodiments, a UE (such as the UE 116) does not expect any two PDCCH monitoring occasions on an active DL BWP, for a same search space set or for different search space sets, in a same CORESET to be separated by a non-zero number of symbols that is smaller than the CORESET duration.

In certain embodiments, a UE (such as the UE 116) determines a PDCCH monitoring occasion on an active DL BWP from the PDCCH monitoring periodicity, the PDCCH monitoring offset, and the PDCCH monitoring pattern within a slot. For search space set s, the UE determines that a PDCCH monitoring occasion(s) exists in a slot with number $n_{s,f}^{\mu}$ in a frame with number $n_f$ if $(n_f \cdot N_{slot}^{frame,\mu}+n_{s,f}^{\mu}-o_s)\ \text{mod}\ k_s=0$. The UE monitors PDCCH candidates for search space set s for $T_s$ consecutive slots, starting from slot $n_{s,f}^{\mu}$, and does not monitor PDCCH candidates for search space set s for the next $k_s - T_s$ consecutive slots.

A USS at CCE aggregation level $L \in \{1, 2, 4, 8, 16\}$ is defined by a set of PDCCH candidates for CCE aggregation level L.

If a UE is configured with CrossCarrierSchedulingConfig for a serving cell the carrier indicator field value corresponds to the value indicated by CrossCarrierSchedulingConfig.

For an active DL BWP of a serving cell on which a UE monitors PDCCH candidates in an USS, if the UE is not configured with a carrier indicator field, the UE monitors the PDCCH candidates without carrier indicator field. For an active DL BWP of a serving cell on which a UE monitors PDCCH candidates in an USS, if a UE is configured with a carrier indicator field, the UE monitors the PDCCH candidates with carrier indicator field.

A UE does not expect to monitor PDCCH candidates on an active DL BWP of a secondary cell if the UE is configured to monitor PDCCH candidates with carrier indicator field corresponding to that secondary cell in another serving cell. For the active DL BWP of a serving cell on which the UE monitors PDCCH candidates, the UE monitors PDCCH candidates at least for the same serving cell.

For a search space set s associated with CORESET p, the CCE indexes for aggregation level L corresponding to PDCCH candidate $m_{s,n_{CI}}$ of the search space set in slot $n_{s,f}^{\mu}$ for an active DL BWP of a serving cell corresponding to carrier indicator field value $n_{CI}$ are described in Equation (1), below.

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i \quad (1)$$

Here in Equation (1), for any CSS, $Y_{p,n_{s,f}^{\mu}} = 0$. Additionally for a USS, $Y_{p,n_{s,f}^{\mu}} = (A_p \cdot Y_{p,n_{s,f}^{\mu}-1}) \bmod D$, $Y_{p,-1} = n_{RNTI} \neq 0$, $A_p = 39827$ for p mod 3=0, $A_p = 39829$ for p mod 3=1, $A_p = 39839$ for p mod 3=2, and D=65537. Additionally, i=0, . . . , L−1. The expression $N_{CCE,p}$ is the number of CCEs, numbered from 0 to $N_{CCE,p}-1$, in CORESET p and, if any, per RB set. The expression $n_{CI}$ is the carrier indicator field value if the UE is configured with a carrier indicator field by CrossCarrierSchedulingConfig for the serving cell on which PDCCH is monitored; otherwise, including for any CSS, $n_{CI}=0$. The expression $n_{CI} m_{s,n_{CI}}=0, \ldots, M_{s,n_{CI}}^{(L)}-1$, where $M_{s,n_{CI}}^{(L)}$ is the number of PDCCH candidates the UE is configured to monitor for aggregation level L of a search space set s for a serving cell corresponding to $n_{CI}$. For any CSS $M_{s,max}^{(L)} = M_{s,0}^{(L)}$. For a USS, $M_{s,max}^{(L)}$ is the maximum of $M_{s,n_{CI}}^{(L)}$ over all configured $n_{CI}$ values for a CCE aggregation level L of search space set s. Additionally, the RNTI value used for $n_{RNTI}$ is the C-RNTI.

In certain embodiments, a UE (such as the UE 116) expects to monitor PDCCH candidates for up to 4 sizes of DCI formats that include up to 3 sizes of DCI formats with CRC scrambled by C-RNTI per serving cell. (This rule is sometimes referred to as the "3+1" DCI format size budget.) The UE counts a number of sizes for DCI formats per serving cell based on a number of configured PDCCH candidates in respective search space sets for the corresponding active DL BWP.

A PDCCH candidate with index $m_{s_j,n_{CI}}$ for a search space set $s_j$ using a set of CCEs in a CORESET p on the active DL BWP for serving cell $n_{CI}$ is not counted for monitoring if there is a PDCCH candidate with index $m_{s_j,n_{CI}}$ for a search space set $s_i \neq s_j$, or if there is a PDCCH candidate with index $n_{s_j,n_{CI}}$ and $n_{s_j,n_{CI}} < m_{s_j,n_{CI}}$, in the CORESET p on the active DL BWP for serving cell $n_{CI}$ using a same set of CCEs, the PDCCH candidates have identical scrambling, and the corresponding DCI formats for the PDCCH candidates have a same size; otherwise, the PDCCH candidate with index $m_{s_j,n_{CI}}$ is counted for monitoring.

In certain embodiments, a UE (such as the UE 116) does not expect to be configured CSS sets that result to corresponding total, or per scheduled cell, numbers of monitored PDCCH candidates and non-overlapped CCEs per slot or per span that exceed the corresponding maximum numbers per slot or per span, respectively.

For same cell scheduling or for cross-carrier scheduling, a UE does not expect a number of PDCCH candidates, and a number of corresponding non-overlapped CCEs per slot or per span on a secondary cell to be larger than the corresponding numbers that the UE is capable of monitoring on the secondary cell per slot or per span, respectively. If a UE is provided monitoringCapabilityConfig=r16monitoringcapability for the primary cell, except the first span of each slot, the UE does not expect a number of PDCCH candidates and a number of corresponding non-overlapped CCEs per span on the primary cell to be larger than the corresponding numbers that the UE is capable of monitoring on the primary cell per span.

For cross-carrier scheduling, the number of PDCCH candidates for monitoring and the number of non-overlapped CCEs per span or per slot are separately counted for each scheduled cell.

In the downlink, the gNB (such as the BS 102) can dynamically allocate resources to UEs via the C-RNTI on PDCCH(s). A UE always monitors the PDCCH(s) in order to find possible assignments when its downlink reception is enabled (activity governed by DRX when configured). When CA is configured, the same C-RNTI applies to all serving cells.

The gNB may pre-empt an ongoing PDSCH transmission to one UE with a latency-critical transmission to another UE. The gNB can configure UEs to monitor interrupted transmission indications using INT-RNTI on a PDCCH. If a UE receives the interrupted transmission indication, the UE may assume that no useful information to that UE was carried by the resource elements included in the indication, even if some of those resource elements were already scheduled to this UE.

In addition, with Semi-Persistent Scheduling (SPS), the gNB can allocate downlink resources for the initial HARQ transmissions to UEs: RRC defines the periodicity of the configured downlink assignments while PDCCH addressed to CS-RNTI can either signal and activate the configured downlink assignment, or deactivate it; i.e. a PDCCH addressed to CS-RNTI indicates that the downlink assignment can be implicitly reused according to the periodicity defined by RRC, until deactivated. When required, retransmissions are explicitly scheduled on PDCCH(s).

The dynamically allocated downlink reception overrides the configured downlink assignment in the same serving cell, if they overlap in time. Otherwise, a downlink reception according to the configured downlink assignment is assumed, if activated.

The UE may be configured with up to 8 active configured downlink assignments for a given BWP of a serving cell. When more than one is configured: (i) the network decides which of these configured downlink assignments are active at a time (including all of them); and (ii) each configured downlink assignment is activated separately using a DCI command and deactivation of configured downlink assignments is done using a DCI command, which can either deactivate a single configured downlink assignment or multiple configured downlink assignments jointly.

PUSCH may be scheduled with DCI on PDCCH, or a semi-static configured grant may be provided over RRC, where two types of operation are supported: (i) the first PUSCH is triggered with a DCI, with subsequent PUSCH transmissions following the RRC configuration and scheduling received on the DCI, or (ii) the PUSCH is triggered by data arrival to the UE's transmit buffer and the PUSCH transmissions follow the RRC configuration.

In the uplink, the gNB can dynamically allocate resources to UEs via the C-RNTI on PDCCH(s). A UE always monitors the PDCCH(s) in order to find possible grants for uplink transmission when its downlink reception is enabled (activity governed by DRX when configured). When CA is configured, the same C-RNTI applies to all serving cells.

In certain embodiments, the gNB may cancel a PUSCH transmission, or a repetition of a PUSCH transmission, or an SRS transmission of a UE for another UE with a latency-critical transmission. The gNB can configure UEs to monitor cancelled transmission indications using CI-RNTI on a PDCCH. If a UE receives the cancelled transmission indication, the UE shall cancel the PUSCH transmission from the earliest symbol overlapped with the resource or the SRS transmission overlapped with the resource indicated by cancellation.

In addition, with Configured Grants, the gNB can allocate uplink resources for the initial HARQ transmissions and HARQ retransmissions to UEs. Two types of configured uplink grants are defined, denoted as Type 1 and Type 2. With Type 1, RRC directly provides the configured uplink grant (including the periodicity). With Type 2, RRC defines the periodicity of the configured uplink grant while PDCCH addressed to CS-RNTI can either signal and activate the configured uplink grant or deactivate the configured uplink grant, i.e., a PDCCH addressed to CS-RNTI indicates that the uplink grant can be implicitly reused according to the periodicity defined by RRC, until deactivated.

If the UE is not configured with enhanced intra-UE overlapping resources prioritization, the dynamically allocated uplink transmission overrides the configured uplink grant in the same serving cell, if they overlap in time. Otherwise. an uplink transmission according to the configured uplink grant is assumed, if activated.

If the UE is configured with enhanced intra-UE overlapping resources prioritization, in case a configured uplink grant transmission overlaps in time with dynamically allocated uplink transmission or with another configured uplink grant transmission in the same serving cell, the UE prioritizes the transmission based on the comparison between the highest priority of the logical channels that have data to be transmitted and which are multiplexed or can be multiplexed in MAC PDUs associated with the overlapping resources. Similarly, in case a configured uplink grant transmissions or a dynamically allocated uplink transmission overlaps in time with a scheduling request transmission, the UE prioritizes the transmission based on the comparison between the priority of the logical channel which triggered the scheduling request and the highest priority of the logical channels that have data to be transmitted and which are multiplexed or can be multiplexed in MAC PDU associated with the overlapping resource. In case the MAC PDU associated with a deprioritized transmission has already been generated, the UE keeps it stored to allow the gNB to schedule a retransmission. The UE may also be configured by the gNB to transmit the stored MAC PDU as a new transmission using a subsequent resource of the same configured uplink grant configuration when an explicit retransmission grant is not provided by the gNB.

Retransmissions other than repetitions are explicitly allocated via PDCCH(s) or via configuration of a retransmission timer.

The UE may be configured with up to 12 active configured uplink grants for a given BWP of a serving cell. When more than one is configured, the network decides which of these configured uplink grants are active at a time (including all of them). Each configured uplink grant can either be of Type 1 or Type 2. For Type 2, activation and deactivation of configured uplink grants are independent among the serving cells. When more than one Type 2 configured grant is configured, each configured grant is activated separately using a DCI command and deactivation of Type 2 configured grants is done using a DCI command, which can either deactivate a single configured grant configuration or multiple configured grant configurations jointly.

When a supplementary uplink (SUL) is configured, the network should ensure that an active configured uplink grant on SUL does not overlap in time with another active configured uplink grant on the other UL configuration.

For both dynamic grant and configured grant, for a transport block, two or more repetitions can be in one slot, or across slot boundary in consecutive available slots with each repetition in one slot. For both dynamic grant and configured grant Type 2, the number of repetitions can be also dynamically indicated in the L1 signalling. The dynamically indicated number of repetitions shall override the RRC configured number of repetitions, if both are present.

In Multiple Transmit/Receive Point (multi-TRP) operation, a serving cell can schedule UE from two TRPs, providing better PDSCH coverage, reliability and/or data rates.

There are two different operation modes for multi-TRP: single-DCI and multi-DCI. For both modes, control of uplink and downlink operation is done by both physical layer and MAC. In single-DCI mode, UE is scheduled by the same DCI for both TRPs and in multi-DCI mode, UE is scheduled by independent DCIs from each TRP.

In certain embodiments, a HARQ operation is supported for DL reception. For example, asynchronous Incremental Redundancy HARQ can be supported. The gNB provides the UE with the HARQ-ACK feedback timing either dynamically in the DCI or semi-statically in an RRC configuration. Retransmission of HARQ-ACK feedback is supported for operation with shared spectrum channel access by using enhanced dynamic codebook and/or one-shot triggering of HARQ-ACK transmission for all configured CCs and HARQ processes in the PUCCH group. The UE may be configured to receive code block group-based transmissions where retransmissions may be scheduled to carry a sub-set of all the code blocks of a transport block (TB).

In certain embodiments, a HARQ operation is supported for UL transmission. For example, Asynchronous Incremental Redundancy HARQ can be supported. The gNB schedules each uplink transmission and retransmission using the uplink grant on DCI. For operation with shared spectrum channel access, UE can also retransmit on configured grants. The UE may be configured to transmit code block group-based transmissions where retransmissions may be scheduled to carry a sub-set of all the code blocks of a transport block.

In certain embodiments, up to two HARQ-ACK codebooks corresponding to a priority (high/low) can be constructed simultaneously. For each HARQ-ACK codebook, more than one PUCCH for HARQ-ACK transmission within a slot is supported. Each PUCCH is limited within one sub-slot, and the sub-slot pattern is configured per HARQ-ACK codebook.

The HARQ functionality ensures delivery between peer entities at Layer 1. A single HARQ process supports one TB when the physical layer is not configured for downlink/uplink spatial multiplexing, and when the physical layer is configured for downlink/uplink spatial multiplexing, a single HARQ process supports one or multiple TBs.

In case of CA, the multi-carrier nature of the physical layer is only exposed to the MAC layer for which one HARQ entity is required per serving cell. In both uplink and downlink, there is one independent HARQ entity per serving cell and one transport block is generated per assignment/grant per serving cell in the absence of spatial multiplexing. Each transport block and its potential HARQ retransmissions are mapped to a single serving cell.

It is noted that PUCCH carries the Uplink Control Information (UCI) from the UE to the gNB. UCI includes at least HARQ-ACK information, scheduling request (SR), and channel state information (CSI).

UCI can be transmitted on a PUCCH or multiplexed in a PUSCH. UCI multiplexing in PUSCH is supported when UCI and PUSCH transmissions coincide in time, either due to transmission of a UL-SCH transport block or due to triggering of A-CSI transmission without UL-SCH transport block: (i) UCI carrying HARQ-ACK feedback with 1 or 2 bits is multiplexed by puncturing PUSCH; and (ii) in all other cases UCI is multiplexed by rate matching PUSCH.

For configured grants operation with shared spectrum channel access, a Configured Grant Uplink Control Information (CG-UCI) is transmitted in PUSCH scheduled by configured uplink grant. For operation with shared spectrum channel access, multiplexing of CG-UCI and PUCCH carrying HARQ-ACK feedback can be configured by the gNB. If not configured, when PUCCH overlaps with PUSCH scheduled by a configured grant within a PUCCH group and PUCCH carries HARQ ACK feedback, PUSCH scheduled by configured grant is skipped.

It is noted that throughout the present disclosure, embodiments are described in terms of multiple PDSCHs or multiple PUSCHs that are jointly scheduled on multiple serving cells, such as a subset/set of cells from among one or more sets of co-scheduled cells.

The embodiments can apply to various other scenarios such as when a UE is jointly scheduled to receive/transmit multiple PDSCHs/PUSCHs: (i) from/to multiple transmission-reception points (TRPs) or other communication entities, such as multiple distributed units (DUs) or multiple remote radio heads (RRHs) and so on, for example, in a distributed MIMO operation, wherein TRPs/DUs/RRHs can be associated with one or more cells; or (ii) in multiple time units, such as multiple slots or multiple transmission time intervals (TTIs); or (iii) on one or more TRPs/cells, wherein the UE can receive/transmit more than one PDSCH/PUSCH on each co-scheduled TRP/cell; or (iv) for multiple transport blocks (TBs), or for multiple codewords (CWs) corresponding to single TB or multiple TBs; or (v) for multiple semi-persistently scheduled PDSCHs (SPS PDSCHs) or for multiple configured grant PUSCHs (CG PUSCHs) that are jointly activated on one or multiple TRPs/cells.

Accordingly, any reference to "co-scheduled cells" can be replaced with/by "co-scheduled TRPs/DUs/RRHs" or "co-scheduled slots/TTIs", or "co-scheduled PDSCHs/PUSCHs", or "co-scheduled TBs/CWs", or "co-scheduled SPS-PDSCHs/CG-PUSCHs", and so on. Similar for other related terms, such as "multi-cell scheduling", and so on.

Various embodiments consider reception of multiple PDSCHs or transmission of multiple PUSCHs on respective cells, including carriers of a same cell such as on an UL carrier (also referred to as, a normal UL (NUL) carrier) or a SUL carrier. The embodiments also apply to cases where scheduling is for a mixture of PDSCHs and PUSCHs. For example, the UE can receive first PDSCHs on respective first cells and can transmit second PUSCHs on respective second cells, wherein the first PDSCHs and the second PUSCHs are jointly scheduled.

The following embodiments of the present disclosure describe multicell scheduling operations.

In certain embodiments, a UE (such as the UE 116) can be provided one or more sets of co-scheduled cells by higher layers. The term set of co-scheduled cells is used to refer to a set of serving cells wherein the UE can be scheduled PDSCH receptions or PUSCH transmissions on two or more cells from the set of co-scheduled cells by a single DCI format, or by using complementary methods such as those described below. It is also possible that a PDSCH reception or a PUSCH transmission on any cell from the set of co-scheduled cells is scheduled by a DCI format that does not schedule any other PDSCH reception or PUSCH transmission on any other cells from the set of co-scheduled cells, such as for example by a DCI format not having a multi-cell scheduling capability or when there is no traffic associated with the other cells at a given time. Additionally, the UE can be indicated via a DCI format in a PDCCH or a MAC CE in a PDSCH a subset of a set of co-scheduled cells, wherein cells of the subset can change across different PDCCH monitoring occasions, for example, as indicated by a corresponding DCI format.

Herein, operation with a cell or a set of cells refers to DL/UL transmissions on the cell(s), such as PDSCH receptions or PUSCH transmissions across the cell(s). Operation can also include other UE procedures or behaviors corresponding to DL/UL transmissions, such as reporting HARQ-ACK information, beam/CSI measurement or reporting, transmission or reception or processing of UL/DL reference signals, and so on.

In one example, the UE can be configured for a number of sets of co-scheduled cells by higher layer signaling, such as by a UE-specific RRC configuration. For example, the UE can be configured a first set of cells, such as {cell #0, cell #1, cell #4, cell #7} and a second set {cell #2, cell #3, cell #5, cell #6}. The multiple sets of co-scheduled cells can be scheduled from a same scheduling cell or from different scheduling cells.

In one example, a set of co-scheduled cells can include a PCell/PSCell and one or more SCells. In another example, a set of co-scheduled cells can include only SCells. In one example, a scheduling cell can belong to a set of co-scheduled cells. In another example, the UE does not expect that a scheduling cell belongs to a set of co-scheduled cells.

In one example, per the specifications for the system operation, a set of co-scheduled cells is defined as a set of all scheduled cells from a same scheduling cell and additional higher layer configuration is not required for the set of co-scheduled cells. Accordingly, a DCI format for multi-cell scheduling, or other complementary methods, can jointly schedule any number of scheduled cells that have a same scheduling cell.

In another example, a set of co-scheduled cells can have two or more scheduling cells. For example, a UE (such as the UE 116) can receive a DCI format for scheduling multiple co-scheduled cells on a first scheduling cell in a first PDCCH monitoring occasion, or on a second scheduling cell in a second PDCCH monitoring occasion. The DCI format can be one with CRC scrambled with any RNTI or restricted to CRC scrambled by a RNTI provided by UE-specific RRC signaling such as a C-RNTI, CS-RNTI, or MCS-C-RNTI. Such PDCCH monitoring from two scheduling cells can be simultaneous, for example in a same slot, or can be non-overlapping, such as in different slots (per higher layer configuration, or per indication in a PDCCH or via a MAC CE). The UE may or may not expect that both the first scheduling cell and the second scheduling cell schedule transmissions or receptions on a same cell. The UE can also monitor PDCCH for detection of a DCI format providing scheduling only on one cell from the set of co-scheduled cells (single-cell scheduling DCI format). Also, for single-cell scheduling, the UE may be configured to monitor PDCCH for a first scheduled cell on (only) the first scheduling cell and monitor PDCCH for a second scheduled cell on (only) the second scheduling cell. In such a case, scheduling by two scheduling cells may apply only to multi-cell scheduling and may not apply to single-cell scheduling.

It is noted that different sets of co-scheduled cells can have a same number of cells, or can have different numbers of cells based on, for example, a separate configuration, such as by UE-specific RRC signaling, of scheduled cells per set of co-scheduled cells.

In certain embodiments, a UE (such as the UE 116) can report one or more of: a maximum number of sets of co-scheduled cells, or a maximum number of cells within a set of co-scheduled cells, or a maximum total number of co-scheduled cells across different sets, or a maximum number of co-scheduled cells per PDCCH monitoring occasion, as capability(-ies) to the gNB. In one example, a number of set(s), or a number of cells within each set of co-scheduled cells, or a total number of co-scheduled cells, or a number of co-scheduled cells per PDCCH monitoring occasion can depend on an operating frequency band or a frequency range.

A UE can also be configured a number of cells that do not belong to any of set(s) of co-scheduled cells. For example, the UE can be configured a cell #8 that does not belong to either the first set or the second set in the previous example.

In one example, restrictions can apply for co-scheduled cells and a UE can expect that co-scheduled cells in a corresponding set: (i) have a same numerology (SCS configuration and CP); or (ii) have a same numerology for respective active DL/UL BWPs; or (iii) have a same duplex configuration, for example, all cells have FDD configuration, or all cells have TDD configuration; or (iv) are within a same frequency band (intra-band CA).

In certain embodiments, a serving cell can belong only to a single set of co-scheduled cells, so that the sets of co-scheduled cells do not include any common cell or can belong to multiple sets of co-scheduled cells to enable larger scheduling flexibility to a serving gNB. For example, a serving cell can belong to a first set of co-scheduled cells and to a second set of co-scheduled cells, when cells in the first and second sets of co-scheduled cells have a common feature such as a common numerology, duplex configuration, operating frequency band/range, and so on. In a further example, a serving cell can belong to both a first set of co-scheduled cells and to a second set of co-scheduled cells, when the serving cell has a first common feature with cells in the first set of co-scheduled cells, and a second common feature with cells in the second set of co-scheduled cells, wherein the first common feature can be different from the second common feature.

For a first approach, a UE (such as the UE 116) expects to be provided multi-cell scheduling for all cells in a set of co-scheduled cells. For example, for a first set of co-scheduled cells including cells {cell #0, cell #1, cell #4, cell #7}, a DCI format schedules PDSCH receptions or PUSCH transmissions on all four cells in the first set of co-scheduled cells {cell #0, cell #1, cell #4, cell #7}.

For a second approach, the UE can be provided multi-cell scheduling for a subset of a set of co-scheduled cells. For example, a DCI format can schedule PDSCH receptions or PUSCH transmissions on only two cells, such as {cell #0, cell #4}, from the first set of cells.

For a first option for the second approach, the subset of cells can be indicated by a MAC CE. Such a MAC CE command can include one or more of: an indication for activation or deactivation/release of a subset of cells; an indication for a number of sets of co-scheduled cells; or an indication for a number of subsets of co-scheduled cells from a corresponding number of sets of co-scheduled cells.

For example, a MAC CE activates a first subset of a set of co-scheduled cells and subsequent DCI format(s) for multi-cell scheduling apply to the first subset of cells activated by the MAC CE. The UE can receive another MAC CE command that deactivates the first subset of co-scheduled cells, or activates a second subset of co-scheduled cells, wherein the second subset can be a subset of the same set of co-scheduled cells or a subset of a different set of co-scheduled cells. If a UE receives a MAC CE that deactivates the first subset of co-scheduled cells but does not activate a second subset of co-scheduled cells, in one alternative, the UE does not expect to receive a DCI format for multi-cell scheduling, and the UE may not monitor PDCCH according to respective search space sets, until the UE receives a new MAC CE that activates a second subset of co-scheduled cells. In another alternative, the UE can receive DCI format(s) for multi-cell scheduling even before receiving a new MAC CE that activates a second subset of co-scheduled cells, but the UE expects to be provided an indication for a subset of co-scheduled cells by the DCI format(s), or by using complementary methods such as those described in herein, for multi-cell scheduling.

For a second option for the second approach, the subset of the set of co-scheduled cells can be provided by a DCI format in a PDCCH/PDSCH. The subset of cells can change between PDCCH monitoring occasions (MOs) for PDSCH/PUSCH scheduling as indicated by a corresponding DCI format. For example, a first DCI format in a first PDCCH MO indicates scheduling on a first subset of cells, while a second DCI format in a second PDCCH MO indicates scheduling on a second subset of cells. In one example, a DCI format for multi-cell scheduling provides indexes of cells that are co-scheduled or a configured index for the subset of co-scheduled cells or CIF values corresponding to the co-scheduled cells. For example, RRC signaling can indicate first/second/third indexes and corresponding first/second/third subsets from a set of co-scheduled cells (or first/second/third sets of co-scheduled cells), a fourth index can correspond to all cells from the set of co-scheduled cells (or to all sets of co-scheduled cells), and a first field of 2 bits in a DCI format can provide a value for the index to indicate the scheduled cells. It is also possible to include a 1-bit flag field to indicate whether the DCI format is for single-cell scheduling or for multi-cell scheduling in order for a UE to accordingly interpret the other fields of the DCI format.

Then, for single-cell scheduling, the first field can be interpreted as a CIF field in case of cross-carrier scheduling. In another example, a DCI format for multi-cell scheduling provides a number of co-scheduled cells, and the indexes of the co-scheduled cells are provided by additional methods, such as by an additional DCI format or by higher layer signaling as described in herein.

In one example, a CIF in a DCI format for multi-cell scheduling can indicate a subset of co-scheduled cells from a set of co-scheduled cells, wherein a mapping between values of the CIF and subsets of co-scheduled cells is configured by UE-specific RRC signaling. One value of the CIF can correspond to all cells from the set of co-scheduled cells (or all sets of co-scheduled cells). The indication can be by an index of the sub-set of co-scheduled cells or by a bitmap mapping to the sub-sets of co-scheduled cells. In another example, separate CIF values are indicated per co-scheduled cell, wherein an indication can be a cell index or a single-cell CIF index, or by a bitmap mapping to each of the co-scheduled cells. When the DCI format is always applicable to all cells in the set of co-scheduled cells, the DCI format does not include a CIF.

For a third option for the second approach, a UE can determine the indexes for the co-scheduled cells. For example, the UE can determine the indexes for the co-scheduled cells based on a PDCCH monitoring parameter, in which the UE has received the DCI format for multi-cell scheduling. Example monitoring parameter include: (i) a CORESET index; or (ii) a search space set index, or a carrier indicator parameter n_CI corresponding to the search space set index; or (iii) a set of CCEs in the search space set or a first/last CCE in the search space set.

According to the third option, the UE can be configured a mapping among values for PDCCH monitoring parameters, such as search space sets, and a number of co-scheduled cells or indexes of the co-scheduled cells. In one example, a first value for parameter n_CI in a search space set can indicate a first subset of co-scheduled cells, and a second value for parameter n_CI in the search space set can indicate a second subset of co-scheduled cells. According to this example, the parameter n_CI can correspond to a single cell (legacy behavior) or can correspond to a group of cells, such as a subset/set of co-scheduled cells.

When a cell is configured to be in a set of co-scheduled cells, the UE can still receive a DCI format that schedules a PDSCH reception or PUSCH transmission only on the cell (single-cell scheduling DCI format). The UE can distinguish a single-cell scheduling DCI format from a multi-cell scheduling DCI format via various methods, such as a DCI format size, or an RNTI used for scrambling a CRC of a DCI format for multi-cell scheduling, or by an explicit indication by a corresponding field in the DCI format.

A set of DL/UL transmissions on a respective set/subset of cells that are jointly scheduled by a single DCI format, or by using complementary methods such as those described in herein, can refer to multiple PDSCHs or multiple PUSCHs that may or may not overlap in time. For example, the UE can be indicated to receive multiple PDSCHs or to transmit multiple PUSCHs on multiple co-scheduled cells wherein all receptions/transmissions are in a same slot or at least one reception/transmission is in a different slot than the remaining ones.

Multi-cell scheduling can be an optional UE feature with capability signaling that can additionally be separate for PDSCH receptions and for PUSCH transmissions. For example, a UE can report a capability for a maximum number of {2, 4, 8, 16} co-scheduled cells for the DL and a maximum of {2, 4} co-scheduled cells for the UL.

In certain embodiments, a UE (such as the UE 116) that is configured for multi-cell scheduling can be provided a first set of cell-common scheduling information parameters, whose values apply to all co-scheduled cells, and a second set of cell-specific scheduling information parameters, whose values apply for each corresponding co-scheduled cell. The UE can determine cell-common and cell-specific scheduling information parameters based on the specifications of the system operation or based on higher layer configuration. For some cell-specific scheduling information parameters, the UE can be provided differential values compared to a reference value wherein the reference value can correspond, for example, to a first scheduled cell from a set of scheduled cells.

For a UE that is configured a number of sets of co-scheduled cells, a DCI format for multi-cell scheduling can provide complete or partial scheduling information, for cell-common or cell-specific scheduling parameters, for multiple PDSCH receptions or multiple PUSCH transmissions on respective multiple co-scheduled cells. When the DCI format for multi-cell scheduling provides partial scheduling information, the UE can determine remaining scheduling information from UE-specific RRC signaling, or by using other complementary methods.

In one example, a DCI format for multi-cell scheduling can have a same size as a DCI format for single cell scheduling. This can enable maintaining a total number of DCI format sizes when supporting multi-cell scheduling and avoid fragmentation of a number of PDCCH candidates that a UE can monitor over an increased number of DCI format sizes, thereby avoiding having a smaller number of PDCCH candidates per DCI format size. In another example, the UE does not expect to receive a DCI format for multi-cell scheduling that is same as or has a same size as a DCI format 1_0 or 0_0 as a differentiation between single-cell scheduling and multi-cell scheduling may not be possible since an additional field to provide such differentiation may not be possible to include in a DCI format 1_0 or 0_0.

The following embodiments of the present disclosure describe multi-stage PDCCHs/DCIs for multi-cell scheduling. This is described in the following examples and embodiments, such as those of FIG. 6.

Figure 6:
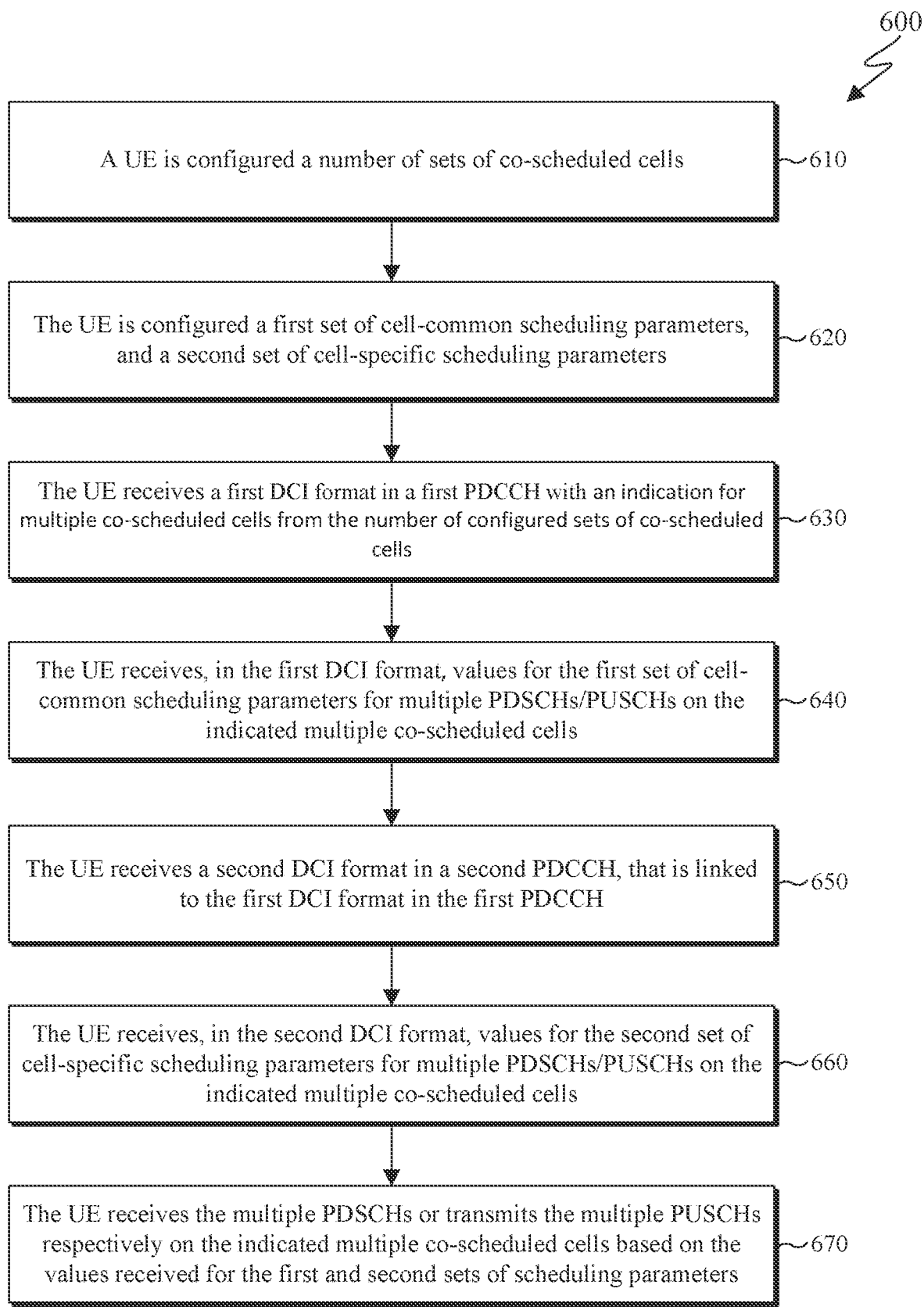
FIG. 6 illustrates an example method for multi-cell scheduling using two linked PDCCHs/DCI formats according to embodiments of the present disclosure.

FIG. 6 illustrates an example method for multi-cell scheduling using two linked PDCCHs/DCI formats according to embodiments of the present disclosure. The steps of the method 600 of FIG. 6 can be performed by any of the UEs 111-119 of FIG. 1, such as the UE 116 of FIG. 3. The method 600 is for illustration only and other embodiments can be used without departing from the scope of the present disclosure.

In certain embodiments, a UE (such as the UE 116) can be provided information for multi-cell scheduling of multiple PDSCHs/PDCCHs on multiple co-scheduled cells using a multi-stage scheduling method, such as a two-stage scheduling method that includes two DCI formats. For example, a first DCI format includes a set of cell-common scheduling parameters/fields for all co-scheduled PDSCHs/PUSCHs, and a second DCI format includes multiple sets of cell-specific scheduling parameters/fields for the multiple respective PDSCHs/PUSCHs. The UE receives the first DCI format in a first PDCCH and the second DCI format in a second PDCCH. This approach can be beneficial, for example, for co-scheduling several cells that have several common physical characteristics without incurring latency for receiving the remaining cell-specific fields as the second PDCCH can be received in a same slot as the first PDCCH.

A multi-stage DCI scheduling approach can provide material gain compared to using multiple separate DCI formats/PDCCHs to schedule respective multiple PDSCHs/PUSCHs, for example, by discarding multiple 24-bit CRCs, and avoiding duplication for the cell-common scheduling parameters. In one example, this approach can be applicable to scenarios where co-scheduled cells have several similar physical channel characteristics or configurations, such as for intra-band CA operation.

According to a multi-stage DCI scheduling approach, for example, cell-common scheduling parameters/fields are provided by a first DCI in a first PDCCH and cell-specific scheduling parameters/fields are provided by a second DCI in a second PDCCH. This approach can simplify the overall specification design and the UE/gNB implementations as there is no hardware change for PDSCH reception/transmission (and there is also no hardware change for PDCCH reception/transmission).

In another example, the first DCI format can include first DCI fields and the second DCI format can include second DCI fields for multi-cell scheduling. The first and second DCI fields can correspond to same scheduled cells or different scheduled cells. For example, first DCI field can correspond to first co-scheduled cells and second DCI fields can correspond to second scheduled cells, wherein the first and the second co-scheduled cells are from a set of a co-scheduled cells. For example, first DCI fields can correspond to first scheduling parameters and second DCI fields can correspond to second scheduling parameters. The first and the second scheduling parameters can be separate.

The method 600, as illustrated in FIG. 6 describes an example procedure for multi-cell scheduling using two linked PDCCHs/DCI formats.

In step 610, a UE (such as the UE 116) is configured a number of sets of co-scheduled cells. In step 620, the UE is configured a first set of cell-common scheduling parameters, and a second set of cell-specific scheduling parameters. In step 630, the UE receives a first DCI format in a first PDCCH with an indication for multiple co-scheduled cells from the number of configured sets of co-scheduled cells. In step 640, the UE receives, in a first DCI format, values for the first set of cell-common scheduling parameters for multiple PDSCHs/PUSCHs on the indicated multiple co-scheduled cells. In step 650, the UE receives a second DCI format in a second PDCCH, that is linked to the first DCI format in the first PDCCH. In step 660, the UE receives, in the second DCI format, values for the second set of cell-specific scheduling parameters for multiple PDSCHs/PUSCHs on the indicated multiple co-scheduled cells. In step 670, the UE receives the multiple PDSCHs or transmits the multiple PUSCHs respectively on the indicated multiple co-scheduled cells based on the values received for the first and the second sets of scheduling parameters.

Although FIG. 6 illustrates the method 600 various changes may be made to FIG. 6. For example, while the method 600 is shown as a series of steps, various steps could overlap, occur in parallel, occur in a different order, or occur multiple times. In another example, steps may be omitted or replaced by other steps. For example, steps of the method 600 can be executed in a different order.

The following embodiments of the present disclosure describe an association of multi-stage PDCCHs/DCIs based on DCI format parameters. This is described in the following examples and embodiments, such as those of FIG. 7.

Figure 7:
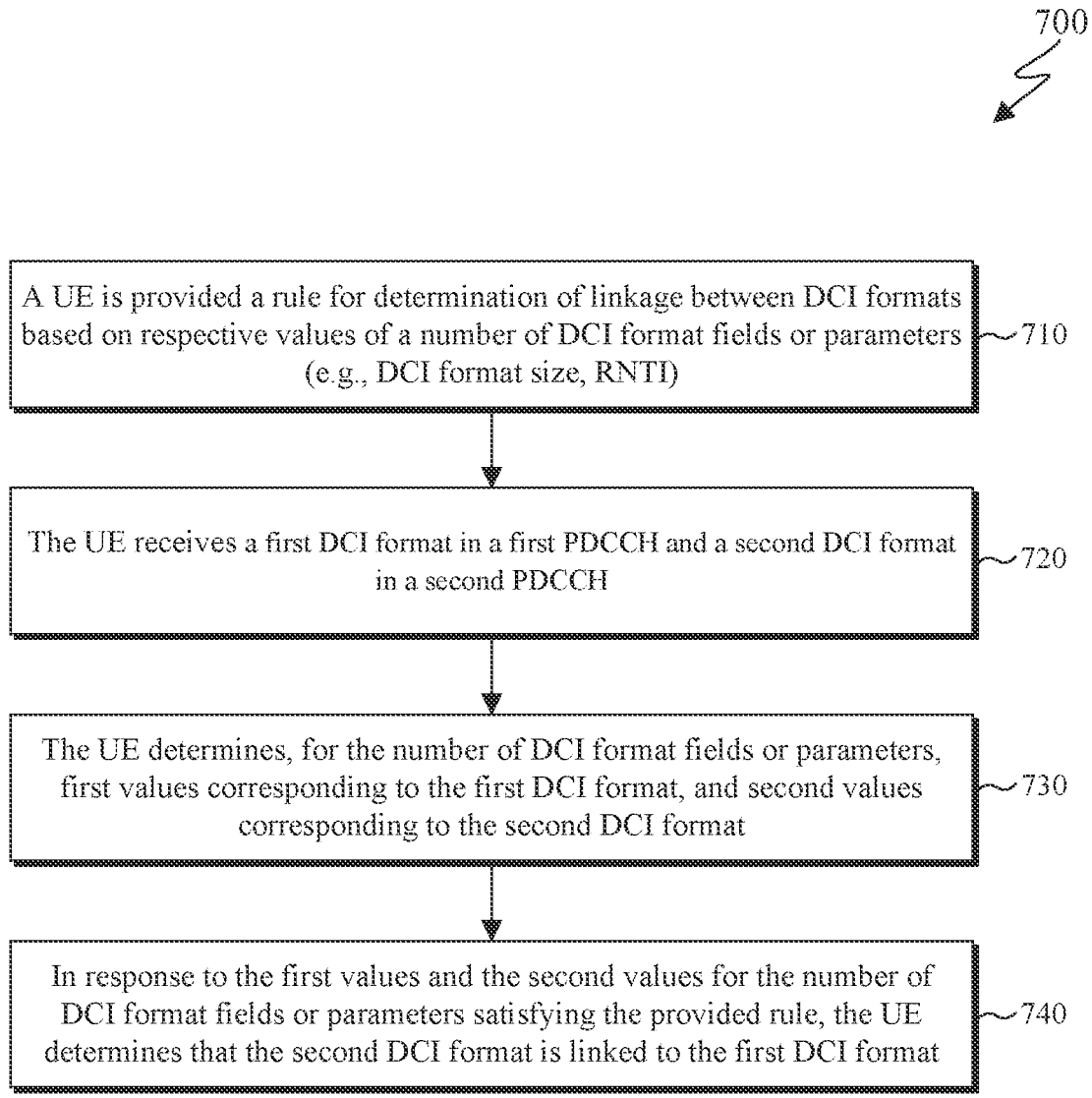
FIG. 7 illustrates an example method for determining two linked PDCCHs/DCI formats, based on DCI format fields or parameter according to embodiments of the present disclosure.

FIG. 7 illustrates an example method for determining two linked PDCCHs/DCI formats, based on DCI format fields or parameter according to embodiments of the present disclosure. The steps of the method 700 of FIG. 7 can be performed by any of the UEs 111-119 of FIG. 1, such as the UE 116 of FIG. 3. The method 700 is for illustration only and other embodiments can be used without departing from the scope of the present disclosure.

In certain embodiments, a UE (such as the UE 116) can determine an association between a number of linked PDCCHs/DCIs, such as two linked or multi-stage PDCCHs/DCIs, that provide multi-cell scheduling information based on parameters of the linked DCI formats, such as size(s) of the DCI format(s), or RNTI(s) associated with the DCI format(s), or by an explicit indication in some field(s) in the DCI format(s). Such association enables the UE to identify the two linked DCI formats, among other DCI formats that the UE receives, such as single-cell-scheduling DCI formats.

The UE needs to determine an association between the first DCI format and the second DCI format in order to combine the cell-common and the cell-specific scheduling parameters/fields and obtain a complete information for multi-cell scheduling. In one example, the UE can associate a second DCI format to a first DCI format based on one or more of: (i) a dedicated/different DCI format size of the first or second DCI format; or (ii) a field in the first or second DCI format; or (iii) a dedicated/different RNTI used for scrambling CRC(s) of the first or second DCI format; or (iv) an indication by the first DCI format of the PDCCH candidate providing the second DCI format.

In a first option, a first DCI format can have a first size and a second DCI format can have a second size that is different from the first size, wherein the first and second sizes can be predetermined or configured by higher layer signaling. The first DCI format and the second DCI format can have a same or a different size than DCI formats scheduling PDSCH receptions or PUSCH transmissions on a single cell. When the first DCI format and the second DCI format have different sizes and there can only be one multi-cell scheduling of PDSCH receptions or PUSCH transmission per PDCCH monitoring occasion or per slot for a scheduling cell for a UE, no other identification for the first DCI format and for the second DCI format is required.

For example, when the first DCI format and the second DCI format have different sizes that are also different from size(s) for DCI format(s) for single-cell scheduling, the UE can determine the linkage between the first and second DCI formats based on the DCI sizes without any further indication.

In another example, when the first DCI format and the second DCI format have different sizes, and only one of the sizes such as only the size of the first DCI format is different from size(s) for DCI format(s) for single-cell scheduling, the UE can distinguish the first DCI format. When the size of the other DCI format, such as the size of the second DCI format, is same as a size for a DCI format for single-cell scheduling, the UE may need additional indication to distinguish the second DCI format from the DCI format(s) for single-cell scheduling. For example, the second DCI format (and/or the DCI format(s) for single-cell scheduling) can include explicit fields or use dedicated RNTI to make such distinction, as subsequently described.

For a second option for an association of two PDCCHs/DCIs for a UE, the first or the second DCI format can include field(s) to identify the association (and/or order) for the two linked DCI formats. For example, the first DCI format and the second DCI format can include a multi-stage DCI order (MSO) field indicating the order/stage of the DCI format in a multi-stage DCI format comprising of the first and second DCI formats for multi-cell scheduling. The first and second DCI formats can have a same size. For differentiation from single-cell scheduling DCI formats, the first and second DCI formats can have different sizes, or different RNTI, than single-cell scheduling DCI formats. When the size of a single-cell scheduling DCI formats can be same as the size of the first DCI format or the second DCI format, an additional field can be included in both single-cell scheduling DCI formats and multi-stage multi-cell scheduling DCI formats that can have a same size to provide a differentiation. For example, a 1-bit single-cell-multi-cell (SCMC) field can be included to indicate whether the DCI format is a single-cell scheduling one or a multi-cell scheduling one. For example, the first DCI format and the second DCI format can include a 1-bit SCMC field indicating that each DCI format is for multi-cell scheduling and a 1-bit MSO field indicating the order of the DCI format (first or second). If multiple subsets of cells can be scheduled by multiple corresponding multi-stage DCIs in a same PDCCH monitoring occasion, the first DCI format and the second DCI format can include an additional cell subset number (CSN) field to indicate the number or index for the subset of cells.

For a third option, the UE can associate a second DCI format in a second PDCCH to a first DCI format in a first PDCCH based on an RNTI associated with the DCI formats. For example, a first DCI format can be associated with a first RNTI and a second DCI format can be associated with a second RNTI. In one example, at least one of the first RNTI or the second RNTI can be same as an RNTI for single-cell-scheduling DCI formats, such as C-RNTI, CS-RNTI, or MCS-C-RNTI, and in such case differentiating mechanisms described in the first two options additionally apply. In another example, the first RNTI can be different from the second RNTI, and both are different from RNTIs associated with for single-cell scheduling (the MSO and SCMC fields are then unnecessary). In another example, the first RNTI can be same as the second RNTI, and both are different from RNTIs associated with for single-cell scheduling (the SCMC field is then unnecessary).

For a fourth option, the first DCI format can include an indication for the PDCCH candidate that provides the second DCI format. For example, when the first DCI format and the second DCI format have a predetermined association of CCE aggregation levels for corresponding PDCCH candidates, such as a same CCE aggregation level or CCE aggregation levels that are different by a configured offset for an index of possible CCE aggregation levels, the first DCI format can include a 2-bit field to indicate one of four PDCCH candidates with the corresponding CCE aggregation level for the second DCI format. For example, the first and second PDCCHs providing the first and second DCI formats can be transmitted in first and second CORESETs or search space sets, respectively, and a CCE index for a first/smallest/starting CCE of the first and second PDCCH candidates can be linked, such as to be a same CCE index.

In one example, for the case of downlink receptions such as PDSCH receptions, a first DCI format can include one or more of the following fields corresponding to cell-common scheduling parameters for all cells in the set of co-scheduled cells. The fields include at least one of: (i) Link direction (DL or UL): 1 bit; (ii) frequency domain resource allocation (FDRA): up to 19 bits; (iii) time domain resource allocation (TDRA): 4 bits; (iv) virtual resource block (VRB)-to-physical resource block (PRB) mapping: 1 bit; (v) modulation and coding scheme (MCS): 5 bits; (vi) PUCCH resource indicator (PRI): 3 bits; (vii) TPC command for PUCCH: 2 bits; (viii) PDSCH-to-HARQ_feedback time (K1): 3 bits; and (ix) Downlink assignment index (DAI): 2 bits.

In one example, a size of an FDRA can be predetermined or configured, such as to 19 bits based on an assumption for 275 RBs for a maximum active DL BWP size. When an active DL BWP of a cell from the set of co-scheduled cells includes less than 275 RBs, the UE considers only B least significant bits (LBSs) of the FDRA field and discards the remaining (19-B) MSBs of the FDRA field for resource allocation of a PDSCH reception on the cell. A same principle can apply for a PUSCH transmission on the cell.

In another example, the first DCI format can additionally include one or more of the following fields for operation with linked PDCCHs for scheduling a set of co-scheduled cells. In this example, one the fields can be one of (i) Indication of either an index for a subset of cells from the set of co-scheduled cells, wherein the subsets of cells are configured by higher layer signaling or for a bitmap for indication of the co-scheduled cells: either 3 bits or 8 bits, respectively; (ii) DCI linkage indication (DLI) field: 2 bits; (iii) the multi-stage order (MSO) field: 1 bit; and (iv) CRC (scrambled with existing or new RNTI): 24 bits.

The DLI field is subsequently described for the second option of PDCCH/DCI association. The MSO field for indication of first vs. second PDCCH or $1^{st}$ stage DCI vs. $2^{nd}$ stage DCI was described earlier. For example, the MSO field can include more than 1 bit when DCIs or PDCCHs with more than two stages are used. For the indication of co-scheduled cells in case of a bitmap, it is also possible that the first DCI format indicates a number of co-scheduled cells, and the bitmap is provided by the second DCI format.

In one example, for the case of downlink reception, a second DCI format can include one or more of the following fields corresponding to cell-specific scheduling parameters for each cell from the set of co-scheduled cells. In this example, the fields can be: (i) NDI: 1 bit; (ii) RV: 2 bits; (iii) HPN: 4 bits; (iv) AP: 6 bits; and (v) TCI: 3 bits.

In one example, DCI fields in the second DCI format can be differential relative to values provided in the first DCI format. For example, the first DCI format can include a reference value for a cell-specific scheduling parameter, and the second DCI format can include multiple fields corresponding to indications for multiple offset values for respective PDSCHs/PUSCHs on the corresponding co-scheduled cells. The reference value may also be applicable for the first cell from the subset of co-scheduled cells. In another example, the first and second DCI formats can include separate DCI fields. For example, the first DCI format can include values for first set of parameters, and the second DCI format can include values for second set of parameters.

In another example, the second DCI format can additionally include one or more of the following fields for operation with linked PDCCHs for scheduling a set of co-scheduled cells. In this example, the fields can be: (i) DCI linkage indication (DLI) field: 2 bits; (ii) The multi-stage order (MSO) field: 1 bit; and (iii) CRC (scrambled with existing or new RNTI): 24 bits.

In one example, DCI fields in the first DCI format or in the second DCI format can have configurable size. In another example, a configurable size applies only to the second DCI format while the fields in the first DCI format have a fixed size.

In one example, restrictions apply to a number of co-scheduled cells for which cell-specific scheduling parameters/fields are provided in a second DCI format. For example, the UE expects to receive a second DCI format that includes cell-specific scheduling parameters/fields for no more than K, such as K=4, co-scheduled cells. In one example, if the UE receives a first DCI format with cell-common scheduling parameters for M>K, such as K=6, co-scheduled cells, the UE expects to receive a second DCI format that includes cell-specific scheduling parameters/fields for a first K, such as K=4, co-scheduled cells, and receive a third DCI format that includes cell-specific scheduling parameters/fields for a remaining (M−K), such as (M−K)=2, co-scheduled cells. A reason for that restriction is to have a predetermined size for the second DCI format. The third DCI format may also include padding bits so that the third DCI format can have a same size as the second DCI format and the DCI formats can include an identification for their number (beyond the first and second DCI formats).

The method 700, as illustrated in FIG. 7, describes an example procedure for determining two linked PDCCHs/DCI formats, based on DCI format fields or parameter (such as, DCI format size or RNTI).

In step 710, a UE (such as the UE 116) UE is provided a rule for determination of linkage between DCI formats based on respective values of a number of DCI format fields or parameters (e.g., DCI format size, RNTI). In step 720, the UE receives a first DCI format in a first PDCCH and a second DCI format in a second PDCCH. In step 730, the UE determines, for the number of DCI format fields or parameters, first values corresponding to the first DCI format, and second values corresponding to the second DCI format. In response to the first values and the second values for the number of DCI format fields or parameters satisfying the provided rule, the UE in step 740 determines that the second DCI format is linked to the first DCI format.

Although FIG. 7 illustrates the method 700 various changes may be made to FIG. 7. For example, while the method 700 is shown as a series of steps, various steps could overlap, occur in parallel, occur in a different order, or occur multiple times. In another example, steps may be omitted or replaced by other steps. For example, steps of the method 700 can be executed in a different order.

The following embodiments of the present disclosure describe an association of multi-stage PDCCHs/DCIs based on PDCCH monitoring parameters. This is described in the following examples and embodiments, such as those of FIG. 8.

Figure 8:
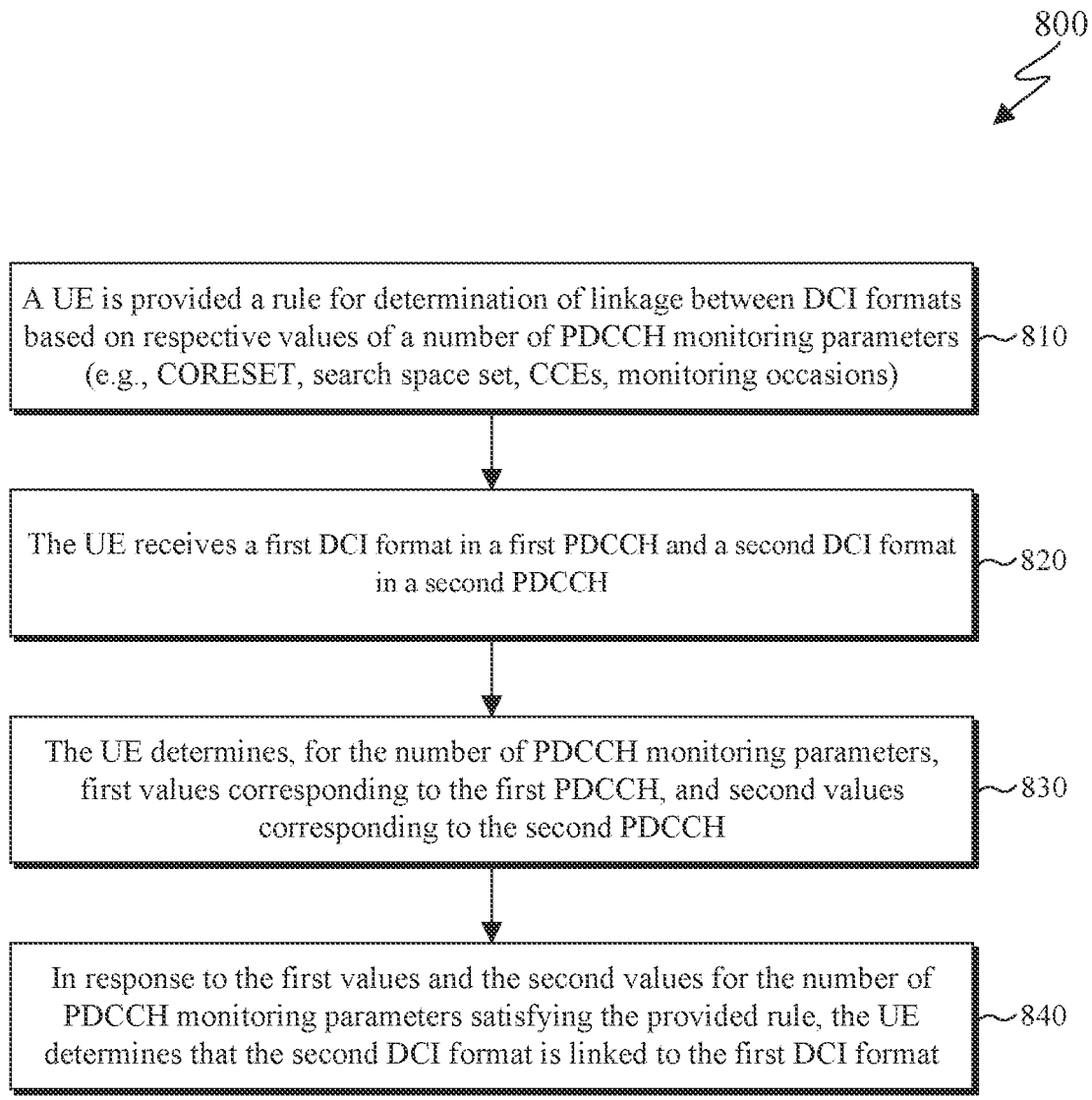
FIG. 8 illustrates an example method for determining two linked PDCCHs/DCI formats, based on a PDCCH monitoring parameter according to embodiments of the present disclosure.

FIG. 8 illustrates an example method for determining two linked PDCCHs/DCI formats, based on a PDCCH monitoring parameter according to embodiments of the present disclosure. The steps of the method 800 of FIG. 8 can be performed by any of the UEs 111-119 of FIG. 1, such as the UE 116 of FIG. 3. The method 800 is for illustration only and other embodiments can be used without departing from the scope of the present disclosure.

In certain embodiments, a UE (such as the UE 116) can determine an association at the physical layer between two linked PDCCHs/DCIs that provide multi-cell scheduling information based on PDCCH monitoring parameters, such as CORESET, search space, CCEs, or PDCCH monitoring occasions where the UE receives the first and the second PDCCHs/DCIs. Such association enables the UE to identify the two linked PDCCHs/DCIs with a reduced number of decoding operations.

A UE can associate a second PDCCH/DCI to a first PDCCH/DCI based on one or more of: (i) a CORESET ID; or (ii) a search space set ID, or a carrier indicator n_CI parameter for a search space set; or (iii) a set of CCEs, or a first CCE; or (iv) a timing/slot/span/monitoring occasion; where the UE receives the first PDCCH or the second PDCCH.

In one example, for a second PDCCH/DCI format that is associated with a first PDCCH/DCI format for multi-stage multi-cell scheduling, the UE expects to receive both the first and the second PDCCHs in a same CORESET or in a same search space set, including a CORESET or a search space set that is dedicated to multi-cell scheduling, or a CORESET or a search space set that is also used for single-cell scheduling. A search space set for multi-cell scheduling can be restricted to UE-specific search space (USS) sets.

In another example, the UE can be configured two linked CORESETs or two linked search space sets, and the UE can receive a first PDCCH in a first CORESET or search space and receive a second linked PDCCH in a second linked CORESET or a second linked search space set.

In one example, if the two linked PDCCHs correspond to two different CORESETs, the UE expects that a same TCI state is configured/activated/indicated for the two CORESETs, at least when the CORESETs are configured with spatial transmission properties (QCL Type-D). In another example, if the two linked PDCCHs correspond to two different search space sets, the UE expects that the two search space sets have a same periodicity. Alternatively, the first DCI format and the second DCI format can always be jointly associated with same search space sets.

When the first PDCCH and the second PDCCH can have different CCE aggregation levels, a field in the DCI format can indicate the CCE aggregation level for the second PDCCH. For example, when the CCE aggregation level of the first-stage PDCCH is $2^n$, n=0, 1, 2, 3, 4, a 2-bit field with value m, m=0, 1, 2, 3 in the first DCI format can indicate a CCE aggregation level of the second-stage PDCCH is $2^{(n+m) \bmod 4}$. In one example, when such field is not provided in the first DCI format, the UE determines a default value, for example $2^4=16$, as a CCE aggregation level of the second PDCCH. In another example, the UE does not expect a CCE aggregation level of $2^4=16$ for the second PDCCH.

In one example, the first DCI format can be provided by a first PDCCH having a smaller index for a first corresponding CCE than an index for a first corresponding CCE of a second PDCCH that provides the second DCI format. In another example, for a second PDCCH that is associated with a first PDCCH, the UE expects to receive the first and second PDCCHs in respective first/smallest/starting CCEs that are mapped based on a predetermined/configured mapping. For example, the UE can be provided with a mapping/table among possible values of a first/smallest/starting CCE index of a first PDCCH and possible values of a first/smallest/starting CCE index of a second PDCCH that are linked. In one example, the mapping/table provided by higher layer is a one-to-one mapping, so a starting CCE index for the first PDCCH is linked to a unique starting CCE index for the second PDCCH. In another example, the mapping/table provided by higher layer includes multiple values (such as 4 values) for a starting CCE index that are linked to each value of a starting CCE index for the first PDCCH. For example, the first DCI format can include an indication for one value from among the multiple linked values (such as 4 values) for the starting CCE index of the second PDCCH. In another example, the first DCI format does not include any indication, and the UE perform blind decoding among the multiple linked values (such as 4 values) for the starting CCE index of the second PDCCH.

In order to improve a scheduling flexibility and reduce a PDCCH blocking probability, it is also possible that a link between two PDCCHs is provided by a field in the first DCI format. For example, the field can indicate an index of a PDCCH candidate that provides the second PDCCH. Herein, an index of a PDCCH candidate can refer to $m_{s,n_{CI}} = 0, \ldots, M_{s,n_{CI}}^{(L)} - 1$, where $M_{s,n_{CI}}^{(L)}$ is a number of PDCCH candidates the UE is configured to monitor for aggregation level L of a search space set s for a serving cell or a set of co-scheduled cells corresponding to $n_{CI}$. In one example, the UE can be provided, by higher layers, a mapping among a first PDCCH candidate for the first PDCCH that provides the first DCI format and one or multiple PDCCH candidates for the second PDCCH that provides the second DCI format. When such mapping provides multiple linked PDCCH candidates for the second PDCCH, in one option, the UE performs blind decoding among the multiple linked PDCCH candidates, as provided by the higher layers. In another option, the first DCI format include an indication for a second PDCCH candidate from among the multiple linked PDCCH candidates as provided by the higher layers. For example, higher layers provide 4 linked PDCCH candidates, and the first DCI format indicates one PDCCH candidate from the 4 linked PDCCH candidates. In another example, the UE can determine such mapping based on a predetermined rule provided by the specifications for system operation.

In one example, the UE can associate a second PDCCH to a first PDCCH based on a PDCCH monitoring occasion or a reception time of the two PDCCHs. For example, the UE does not expect to receive more than one pair of first and second PDCCHs that provide a first-stage DCI format and a second-stage DCI format, respectively, in a same PDCCH monitoring occasion, or in a same slot/span or during any interval of size N slots/spans, such as N=1 slot or N=2 spans.

In one example, a UE receives a first PDCCH/DCI and a second PDCCH/DCI in a same slot/span. In another example, the UE receives the first PDCCH and the second PDCCH/DCI in different slots or in different spans of a same slot. In the latter example, the UE expects that a time gap between a first PDCCH and a second PDCCH does not exceed a threshold, for example N slots/spans, such as N=1 slot or N=2 spans. In one example, the first DCI format can indicate a slot/span or a monitoring occasion in which the UE can receive the second PDCCH. Such indication can be referred to as a DCI linkage indication (DLI) field. For example, the DLI field can include an index of a slot/span for reception of the second PDCCH. For example, the DL field can include an offset of a slot/span for reception of the second PDCCH relative to a slot/span for reception of the first PDCCH.

In one example, a value of the DLI field in the first/second DCI format can be based on a slot/span in which the UE receives the other PDCCH/DCI format. For example, a first value of the DLI field in the first DCI format can be $V_1 = (b \cdot s_{id,2} + c) \mod 4$ and a second value of the DLI field in the second DCI format can be $V_2 = (b \cdot s_{id,1} + c) \mod 4$, wherein $s_{id,1}$ and $s_{id,1}$ are slot/span indexes for a first slot/span in which the first PDCCH/DCI is received, and a second slot/span where the second PDCCH/DCI is received, respectively. In a further example, different coefficient values can be used for the first DCI format compared to the second DCI format, such as separate coefficients k, d instead of a, c.

In one example, restriction may apply to usage of a DLI field. For example, the UE expects a DLI field (at least) when the UE receives the two linked PDCCHs/DCIs in different slots, or when the two PDCCHs/DCIs are repeated or retransmitted. In another example, the UE does not expect to receive more than one pair of linked PDCCHs/DCI in a same slot or span.

In one example, higher layer configuration or indication(s) by the first (and/or second) DCI format(s) can provide information for more than one parameter for linkage between the first and second PDCCHs or first and second DCI formats. For example, the first DCI format can include indications for two or more parameters such as the following: a CCE aggregation level (AL), an index of a PDCCH candidate, a starting CCE index, a slot/span/MO for the second PDCCH. Such indication can be via two or more separate fields or via a single joint field. For example, higher layers can provide a mapping among values of the single joint field and multiple tuples of values for the two or more parameters as mentioned above. In one example, when the mapping provided by the higher layers include multiple values for a parameter corresponding to the second PDCCH, such as multiple possible indexes for the PDCCH candidate of the second PDCCH, or multiple possible values for the CCE AL for the second PDCCH, in one option, the UE performs blind decoding according to the multiple possible value. In another option, the first DCI format includes an indication for a value from the multiple possible value. The indication can be separate for different PDCCH parameters or can be a joint indication.

In one example, variations or combinations of the above methods can be used, such as both the reception time constraint and the RNTI, or both the reception time constraint and the field(s) in the first or second DCI formats, and so on.

The method 800, as illustrated in FIG. 8, describes an example procedure for determining two linked PDCCHs/DCI formats, based on a PDCCH monitoring parameter (such as, CORESET, search space set, CCEs, or monitoring occasions).

In step 810, a UE (such as the UE 116) is provided a rule for determination of a link between DCI formats based on respective values of a number of PDCCH monitoring parameters, such as indexed of CORESETs, search space sets, CCEs, PDCCH monitoring occasions. In step 820, the UE receives a first DCI format in a first PDCCH and a second DCI format in a second PDCCH. In step 830, the UE determines, for the number of PDCCH monitoring parameters, first values corresponding to the first PDCCH, and second values corresponding to the second PDCCH. In response to the first values and the second values for the number of PDCCH monitoring parameters satisfying the provided rule, the UE in step 840 determines that the second DCI format is linked to the first DCI format.

Although FIG. 8 illustrates the method 800 various changes may be made to FIG. 8. For example, while the method 800 is shown as a series of steps, various steps could overlap, occur in parallel, occur in a different order, or occur multiple times. In another example, steps may be omitted or replaced by other steps. For example, steps of the method 800 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
   receiving:
      a first physical downlink control channel (PDCCH) that provides a first downlink control information (DCI) format; and
      a second PDCCH that provides a second DCI format;
   determining:
      first parameters for reception of a physical downlink shared channel (PDSCH), or for transmission of a physical uplink shared channel (PUSCH), based on values of fields of the first DCI format; and
      second parameters for reception of the PDSCH, or for transmission of the PUSCH, based on values of fields of the second DCI format, wherein the second parameters are different than the first parameters; and
   receiving the PDSCH, or transmitting the PUSCH, based on the first parameters and the second parameters.

2. The method of claim 1, further comprising:
   receiving information for a set of serving cells;
   determining a subset of the set of serving cells based on a value of a field of the first DCI format; and
   receiving PDSCHs, or transmitting PUSCHs, on the subset of serving cells based on the first parameters and the second parameters.

3. The method of claim 2, wherein:
   the first parameters are same for all cells from the subset of the set of serving cells, and the second parameters are separate for each cell from the subset of the set of serving cells.

4. The method of claim 1, further comprising:
   determining that the first PDCCH is linked to the second PDCCH based on linkage of first and second search space sets, wherein:
   the first PDCCH is received according to the first search space set, and
   the second PDCCH is received according to the second search space set.

5. The method of claim 1, further comprising:
   determining that the first PDCCH is linked to the second PDCCH based on a field in the first DCI format including a value indicating an index of a PDCCH candidate corresponding to the second PDCCH.

6. The method of claim 5, wherein the first and second PDCCHs are received according to a same search space set.

7. The method of claim 5, wherein the first and second PDCCHs are received over a same number of control channel elements (CCEs).

8. A user equipment (UE) comprising:
   a transceiver configured to receive:
      a first physical downlink control channel (PDCCH) that provides a first downlink control information (DCI) format; and
      a second PDCCH that provides a second DCI format; and
   a processor operably coupled to the transceiver, the processor configured to determine:
      first parameters for reception of a physical downlink shared channel (PDSCH), or for transmission of a physical uplink shared channel (PUSCH), based on values of fields of the first DCI format; and
      second parameters for reception of the PDSCH, or for transmission of the PUSCH, based on values of fields of the second DCI format, wherein the second parameters are different than the first parameters,
   wherein the transceiver is further configured to receive the PDSCH, or transmit the PUSCH, based on the first parameters and the second parameters.

9. The UE of claim 8, wherein:
   the transceiver is further configured to receive information for a set of serving cells;
   the processor is further configured to determine a subset of the set of serving cells based on a value of a field of the first DCI format; and
   the transceiver is further configured to receive PDSCHs, or transmit PUSCHs, on the subset of serving cells based on the first parameters and the second parameters.

10. The UE of claim 9, wherein:
    the first parameters are same for all cells from the subset of the set of serving cells, and the second parameters are separate for each cell from the subset of the set of serving cells.

11. The UE of claim 8, wherein:
    the processor is further configured to determine that the first PDCCH is linked to the second PDCCH based on linkage of first and second search space sets,
    the first PDCCH is received according to the first search space set, and
    the second PDCCH is received according to the second search space set.

12. The UE of claim 8, wherein the processor is further configured to determine that the first PDCCH is linked to the second PDCCH based on a field in the first DCI format including a value indicating an index of a PDCCH candidate corresponding to the second PDCCH.

13. The UE of claim 12, wherein the first and second PDCCHs are received according to a same search space set.

14. The UE of claim 12, wherein the first and second PDCCHs are received over a same number of control channel elements (CCEs).

15. A base station comprising:
    a transceiver configured to transmit:
       a first physical downlink control channel (PDCCH) that provides a first downlink control information (DCI) format; and
       a second PDCCH that provides a second DCI format; and
    a processor operably coupled to the transceiver, the processor configured to determine:
       first parameters for transmission of a physical downlink shared channel (PDSCH), or for reception of a physical uplink shared channel (PUSCH), based on values of fields of the first DCI format; and second parameters for transmission of the PDSCH, or for reception of the PUSCH, based on values of fields of the second DCI format, wherein the second parameters are different than the first parameters, wherein the transceiver is further configured to transmit the PDSCH, or receive the PUSCH, based on the first parameters and the second parameters.

16. The base station of claim 15, wherein:
the transceiver is further configured to transmit information for a set of serving cells;
the processor is further configured to determine a subset of the set of serving cells based on a value of a field of the first DCI format; and
the transceiver is further configured to transmit PDSCHs, or receive PUSCHs, on the subset of serving cells based on the first parameters and the second parameters.

17. The base station of claim 16, wherein:
the first parameters are same for all cells from the subset of the set of serving cells, and the second parameters are separate for each cell from the subset of the set of serving cells.

18. The base station of claim 15, wherein:
the processor is further configured to determine that the first PDCCH is linked to the second PDCCH based on linkage of first and second search space sets,
the first PDCCH is transmitted according to the first search space set, and
the second PDCCH is transmitted according to the second search space set.

19. The base station of claim 15, wherein the processor is further configured to determine that the first PDCCH is linked to the second PDCCH based on a field in the first DCI format including a value indicating an index of a PDCCH candidate corresponding to the second PDCCH.

20. The base station of claim 19, wherein the first and second PDCCHs are transmitted according to a same search space set.

* * * * *